(12) United States Patent  
Allen et al.

(10) Patent No.: US 9,157,239 B2  
(45) Date of Patent: Oct. 13, 2015

(54) ROOF RIDGE VENTILATION SYSTEM

(75) Inventors: Don Allen, Portland, OR (US); Jay Kamani, Beaverton, OR (US); Phuong Le, Sherwood, OR (US)

(73) Assignee: Digital Control Systems, Inc., Portland, OR (US)

( * ) Notice: Subject to any disclaimer, the term of this patent is extended or adjusted under 35 U.S.C. 154(b) by 0 days.

(21) Appl. No.: 13/241,195

(22) Filed: Sep. 22, 2011

(65) Prior Publication Data

US 2013/0074428 A1    Mar. 28, 2013

(51) Int. Cl.
| | |
|---|---|
| *B61D 17/14* | (2006.01) |
| *E04B 7/00* | (2006.01) |
| *E04D 13/17* | (2006.01) |
| *F24F 7/02* | (2006.01) |

(52) U.S. Cl.
CPC .............. *E04D 13/17* (2013.01); *E04D 13/174* (2013.01); *F24F 7/025* (2013.01); *Y02B 10/20* (2013.01); *Y10T 29/49826* (2015.01)

(58) Field of Classification Search
CPC ......... E04D 13/174; E04D 3/40; E04D 13/17; E04D 1/36; E04D 2003/0875; F24F 7/02; F24F 7/025; F24F 7/065
USPC ........ 52/13, 14, 57, 91.3, 94–97, 41–44, 198, 52/199, 173.3
See application file for complete search history.

(56) References Cited

U.S. PATENT DOCUMENTS

| | | | | | |
|---|---|---|---|---|---|
| 3,481,263 | A | * | 12/1969 | Belden | 454/365 |
| 3,625,134 | A | * | 12/1971 | Smith | 454/365 |
| 3,664,071 | A | * | 5/1972 | Gallagher | 52/15 |
| 4,322,924 | A | * | 4/1982 | Cooper | 52/57 |
| 4,498,526 | A | | 2/1985 | Arenas | |
| 4,501,194 | A | | 2/1985 | Brown | |
| 4,633,769 | A | | 1/1987 | Milks | |
| 4,642,958 | A | * | 2/1987 | Pewitt | 52/302.3 |
| 4,776,262 | A | | 10/1988 | Curran | |
| 5,131,888 | A | | 7/1992 | Adkins, II | |
| 5,277,002 | A | * | 1/1994 | Haag | 52/90.1 |
| 5,452,710 | A | | 9/1995 | Palmer | |

(Continued)

OTHER PUBLICATIONS

Author: Air Vent Inc.; Title of Article: Principles of Attic Ventilation; Title of Item: A comprehensive guide to planning The Balanced System for attic ventilation; Date: Dec. 1, 2010; pp. 1-12; Publisher: Air Vent, Inc.; City and/or Country: Dallas, TX, US.

(Continued)

*Primary Examiner* — Brian Glessner  
*Assistant Examiner* — Omar Hijaz  
(74) *Attorney, Agent, or Firm* — Howard Russell

(57) ABSTRACT

Roof ridge vent system adapted for housing a plurality of fans in a central airflow channel positioned directly over the opening in a ridge portion of a roof for ventilating a plurality of vent chutes or attic space comprising: a hood member engaged with outer edge portions of vent members having air-passageway holes defined therein and inner edge portions preferably being hinged respectively to inner edge portions of base members so as to be adapted for installation on variously-pitched roofs, each base member also having outer edge portions defining a wall adapted for blocking wind from being blown into the vent and for causing airflow over the top of the vent to encourage airflow through the vent system. Vent member sections may be installed end-to-end to define an elongated airflow channel adapted for ventilating with or without assistance from the fans.

24 Claims, 17 Drawing Sheets

(56) References Cited

U.S. PATENT DOCUMENTS

| | | | |
|---|---|---|---|
| 6,151,845 A * | 11/2000 | Lancaster | 52/198 |
| 6,185,880 B1 * | 2/2001 | Richardson | 52/198 |
| 6,267,668 B1 | 7/2001 | Morris | |
| 6,450,882 B1 | 9/2002 | Morris et al. | |
| 6,565,431 B1 | 5/2003 | Villela | |
| 6,623,354 B2 | 9/2003 | Morris et al. | |
| 6,786,815 B1 | 9/2004 | Folsom | |
| 6,913,530 B2 | 7/2005 | Morris et al. | |
| 6,966,156 B2 * | 11/2005 | Dixon | 52/199 |
| 6,997,800 B1 * | 2/2006 | Kohler | 454/365 |
| 7,101,279 B2 | 9/2006 | O'Hagin et al. | |
| 7,393,273 B2 | 7/2008 | Ehrman et al. | |
| 7,485,034 B2 * | 2/2009 | Sells | 454/365 |
| 7,507,151 B1 | 3/2009 | Parker et al. | |
| 8,151,524 B2 * | 4/2012 | Daddio | 52/199 |
| 2002/0194799 A1 * | 12/2002 | Sharp et al. | 52/198 |
| 2003/0019164 A1 * | 1/2003 | Weakes et al. | 52/22 |
| 2003/0024175 A1 * | 2/2003 | Jones et al. | 52/90.1 |
| 2004/0000101 A1 * | 1/2004 | Dixon | 52/43 |
| 2004/0128920 A1 * | 7/2004 | Sharp et al. | 52/57 |
| 2004/0144040 A1 * | 7/2004 | Fulford et al. | 52/57 |
| 2007/3021300 | 9/2007 | Railkar et al. | |
| 2008/0113612 A1 | 5/2008 | Chich et al. | |
| 2009/0178351 A1 * | 7/2009 | Lin | 52/198 |
| 2011/0099924 A1 * | 5/2011 | Huang | 52/198 |
| 2011/0124280 A1 * | 5/2011 | Railkar et al. | 454/341 |
| 2011/0225907 A1 * | 9/2011 | Chang | 52/198 |
| 2012/0144763 A1 * | 6/2012 | Antonic | 52/90.2 |

OTHER PUBLICATIONS

Author: GAF; Title of Article: Green Machine Solar Powered Ecosmart Ridge Vent Application Instructions; Title of the Item: Application Instructions; Date: Updated Mar. 2011; pp. 1-5; Publisher GAF; City and/or Country: Wayne, NJ, US.

Author: GAF; Title of the Article: Green Machine Solar Powered Ecosmart Ridge Vent; Title of the Item: http://www.gaf.com/Roofing/Residential/Products/Roof-Vents/MasterFlow-Green-Machine-Solar-Powered-Ridge-Vent/MasterFlow-Green-Machine-Solar-Powered-Ridge-Vent.aspx#; Date: Feb. 16, 2011; Publisher: World Wide Web—Internet.

Author: GAF; Title of the Article: Green Machine Solar Powered Ecosmart Ridge Vent Sell Sheet; Title of the Item: Sell Sheet; Date Updated Jan. 2011; p. 1-3; Publisher GAF; City and/or Country: Wayne, NJ, US.

* cited by examiner

ROOF RIDGE VENTILATION SYSTEM

FIELD OF INVENTION

This invention relates generally to roof ventilation systems and more specifically to an energy-saving roof ridge ventilation system that is easily adapted for use on a number of variously-pitched roofs, that is adapted for use with a plurality of fans either for ventilating internal vent chutes defined by roofing and insulation materials or for ventilating attic space.

BACKGROUND OF INVENTION

The Need For Ventilation of Vent Chutes and Attic Spaces

As an energy saving means, many homes and roofs are well-insulated and built to tighter tolerances to prevent escape of heating, or alternatively cooling, air. A typical pitched roof comprises a base portion of the roof, known as a solid sheath, which is nailed or otherwise joined to an upper portion of structural rafters for providing a solid surface upon which shingles or other roofing materials are installed.

In particular for today's more modern vaulted ceiling and cathedral ceiling roofs (referred to hereinafter as vaulted ceiling roofs), adjacent the underside of the solid sheath of the roof, and between the rafters supporting the roof, insulation is installed between the solid sheath, the rafters and the ceiling sheet rock. In such vaulted-style ceiling roofs, there is a relatively small (about one to two inches) air gap, also known as a vent chute, defined as air space between the insulation material and the underside of the solid sheath.

On the lower ends of and in airflow communication with the vent chutes of such roofs, there are hanging eaves, or side fascia, soffit vent openings with louvered or screen vent covers. At the upper end of the vent chutes, near the ridgeline peak of the roof, there are typically created openings in the solid sheath for single spot vents, or an opening in the solid sheath near the ridge for a passive ridge vent, for passage of air to the exterior, or outside, of the roof. These openings are covered by a hood, otherwise known as a "pot", in the case of a single spot vent, or an elongated member in the case of a passive ridge vent, for allowing passage of air through the soffit vent, through the vent chute, or optionally from the attic air space itself, and outside the roof through the spot vent or at the ridge vent near the peak of the roof.

While there are perhaps some exceptions, pitched roofs for structures including attic space typically have not included vent chutes as described above, but rather the air in the attic space itself has communicated directly between the soffit vents adjacent the lower portion of the structure comprising the attic space and the spot vent openings on the roof or the ridge vent opening near the peak of the roof.

As roofs and structures have been built over the years to higher standards of sealed construction to make the structures more heating, cooling and weather efficient overall, there has developed an increased need for airflow, other than just passive airflow, in the vent chutes between the solid sheath, the insulation and the rafters of vaulted-ceiling structures. Such enhanced airflow needs have also been presented for attic spaces that have not included vent chutes as described above.

In either case, with vent chutes or without them, household activities such as bathing, laundry, dishwashers, etc., as well as weather, including heavy rain, ice accumulation, and internal and external temperature differentials leading to condensation, all have contributed to moisture buildup under the roof. Without adequate ventilation, this moisture has damaged and reduced the useful life of insulation, rafters, and roofing materials.

While sometimes nearly continuous ventilation of a roof and its corresponding structure are very important for cooling and removing moisture during warmer weather, effective ventilation is also very important to alleviate moisture during wet and icy weather conditions. During colder weather conditions, occupants turn on their furnaces to warm the air in the rooms of the structure, and if unvented, this warm air, especially in rooms where water is used such as in a bathroom or a laundry room, picks up moisture, carrying it into the roofing materials and any attic region of the house through unintentionally existing cracks or leaks in the vapor barrier between the occupied area of the structure and the attic. Often times, the area around the door or retractable stairway allowing attic access from inside the home has been a problem area for such leakage, for example after a worker has accessed the attic.

Heat transfer during cold weather periods, or cooling effect during warm weather periods, transfers heat, or cold, into the attic from the occupied portion of the structure, often causing a temperature differential between inside and outside air, leading to condensation in the attic. Accordingly, during such conditions moist air has condensed into droplets or frost in the attic or vent chutes, and the moisture ultimately has ended up damaging the insulation, roofing and other building materials.

Efficient roof ventilation not only allows cooler and drier attic and occupied spaces within a structure, regardless of outside weather conditions, but it also helps prevent moisture from causing mildew or peeling of paint or otherwise damaging roofing, ceiling or drywall materials.

Inadequacy of Passive Spot Vents

Prior art passive spot vents, also known as pot vents since they have an upside down "pot" covering an opening that is in airway communication with the interior space to be ventilated, have been developed primarily for ventilating attic space and alternatively vent chutes. Further, there have been developed roof building structures and methods which have enabled communication of air between the rafters supporting the roof through corrugated ventilation material, or spacer material, installed between the solid sheath and the rafters. Such ventilation materials have aided the process of ventilation of the vent chutes through spot vents, since they have in theory allowed the ventilation of multiple vent chutes with a single passive spot vent. But this solution, often characterized by a uniform row of such spot vents near the peak of a roof that has been considered by some to be unsightly, has not provided ideal, or even adequate, ventilation of the vent chutes in some cases given adverse weather and use conditions.

Passive spot vents have been considered less effective for ventilation of vent chutes since certain prevailing natural exterior wind and weather conditions have not created sufficient pull of air through the passive spot vent to pull the air out of the space with enough force to dry or adequately cool it. This problem has been exacerbated, especially in more humid climates, by attempts to ventilate multiple chutes with a single passive spot vent.

Fan-Powered Ventilation of Attics and Other Rooms of a Structure

Attic Ventilation

Use of a larger fan for ventilating attic space to a spot vent located on the ridge of a roof or a gable vent is known. However, such a system has not been adapted, nor would it be well-suited to ventilating the vent chutes of a vaulted ceiling roof because of the relatively large number of vent chutes to be ventilated and the desirability of sometimes nearly continuous fan operation in such an application. If the larger single fan of such a system were required to run for extended periods of time to ventilate an area, it would not only consume a significant amount of electric power from the structure's main power system, making it financially less desirable to operate in such a situation, but it would also be prone to system downtime during fan failure and repair periods. Further, special consideration has been required to determine the proper placement of the fan for such a system in order to achieve uniform cooling and ventilation given sometimes complex airflow considerations. Some such systems have also required special wiring to the power main of the structure by an electrical contractor.

Room and Appliance Ventilation

Prior conventional room ventilation systems have included an active, fan-powered, spot vent, or vents, typically controlled by a switch but sometimes including an automated control system, for ventilating interior room space such as a bathroom or laundry room. Such systems are characterized by vent and fan designs rated for the number of cubic feet per minute and ventilation requirements of the area to be ventilated. These ventilation systems route ventilated air through a tube to a wall or the roof at the exterior of a structure and typically are not allowed to leak air into the attic or occupied space of the structure. While a fan-powered spot ventilation system has been devised for ventilation of a room through a port installed on the ridge of a roof, it has not been devised for the purpose of ventilating the vent chute space.

An example of a prior ventilation system for ventilating a room and showing a vent hood located at the ridge of a roof includes FIG. 4 and related text of U.S. Pat. No. 6,786,815, to Folsom, for Apparatus For Venting Rooms With Exhaust Fans. Folsom teaches a ridge ventilator system 20 in communication with an apparatus comprising side, bottom and end panels for directing air from a vent hose communicating with a fan at the other end of the hose for a room to be ventilated, such as a bathroom. Folsom does not teach the use of an elongated ridge vent system extending for all or a significant portion of a roof ridge for ventilation of the vent chutes or attic space of a structure.

Solar-Powered Ventilation Fans For Attics and Other Rooms

U.S. Pat. No. 7,507,151, to Parker et al., for High Efficiency Solar Powered Fan, teaches a fan blade configuration that is capable of being solar powered and for exhausting air out from underneath roofs. Similarly, U.S. Pat. No. 5,131,888 to Adkins, II, for Solar Powered Exhaust Fan, discloses a solar powered exhaust fan having a pipe adapter for connection to the interior of portable buildings. Parker acknowledges the limitations of solar power for a large or otherwise inefficient ventilation fan, and Adkins, II is designed for smaller, portable structures. Neither Parker nor Adkins, II, teaches the use of a plurality of solar-powered fans in an elongated ridge vent system designed for ventilating the vent chutes or attic of a structure.

Prior Art Ridge Vent Ventilation Systems

In an attempt to meet the need for enhanced and more uniform ventilation, as well as the need for an aesthetically pleasing exterior system of vents, prior art passive ridge vent systems that simulate the appearance of ridge cap shingles at the peak of a roof have been developed to ventilate attic spaces and roof structure interiors. Though such ridge vent systems have been naturally more efficient than spot ventilation systems, since warm air naturally rises upwardly toward the ridge of the roof and since they have been able to ventilate the attic space or vent chutes all along the ridge of the roof closely adjacent the area where the warm air first rises to the peak of the roof, their effectiveness has been limited where stagnant wind conditions, higher temperatures and higher moisture and humidity have been present.

Prior art roof ridge ventilation systems designed for ventilation of attic space primarily have been passive systems relying on natural airflow currents and wind patterns. An example of such a system is found in U.S. Pat. No. 6,565,431, to Villela, for Fan Fold Vent. Villela teaches a fan-fold vent comprising a semi-rigid panel adjustable to the configuration of the roof. A gutter with drain slots to prevent accumulation of rain is also disclosed. Villela does not disclose the use of a ridge vent system adapted for housing a fan array within the ridge vent for actively ventilating the vent chutes of a roof.

Another example of a passive roof ridge vent system is found in U.S. Pat. No. 6,267,668, to Morris, for Ridge Cap Vent, which teaches an upper ridge cap member and a lower closure member with corrugated vent material between them and having a multiplicity of transversely extending air passages for allowing ventilation of an interior portion of a roof through the ridge of the rooftop. Morris does not teach the use of a ridge vent system adapted for having a fan array in the ridge vent for actively ventilating vent chute airspace communicating between a ridge vent, soffit vents, insulation and solid sheathing materials.

These prior art systems have not accounted for the fact that certain roof lines facing a certain direction may not be oriented to take advantage of prevailing winds to create adequate passive airflow, have not accounted for the fact that sometimes weather and excess humidity conditions have not been conducive to adequate passive ventilation airflow, and have not generally been adequate for today's larger structures having greater ventilation and cooling needs.

Thus, while passive ridge vents have been developed which take advantage of natural wind and convective air currents to create natural areas of lower pressure outside of the ridgeline of the roof to induce warm air to travel upwardly and outwardly to the exterior at the ridge vents, varying weather, rain, humidity and wind conditions, together with enhanced needs for ventilation in today's modern structures, have created conditions which passive ventilation systems simply cannot adequately ventilate—no matter how well they have been designed.

With increased numbers of vaulted ceiling roof structures comprising vent chute construction, together with tighter-tolerance, higher-efficiency building standards for structures also housing multiple water-oriented activities, there has developed a need for enhanced, sometimes continuous and active ventilation of vent chute space for the purpose of maintaining the structure cool and moisture free during both high-temperature periods and high-humidity periods conducive to a buildup of condensation within the interior space and adjoining areas. Because of such modern sealed construction methods, and because the solid sheath is the most elevated barrier to airflow within the structure, adequate ventilation along the underside of the solid sheath is critical to the long-term well-being of the structure and the roof. This is also why it is along the underside of the solid sheath that ventilation is most effective to reduce heat before it can radiate from the roof to the interior of the structure and is most effective at reducing moisture in the roofing materials.

Accordingly there has long been needed a fan-powered roof ridge ventilation system that is suitable for meeting the needs of appropriately ventilating the vent chutes of a roof, and especially such a system that is energy efficient, is easily retrofitted to existing structures and is preferably able to be solar-powered without the need for employment of an electrical contractor to retrofit or otherwise install the system.

Such a system would save energy because the desired area along and underneath the upper portion of the pitched roof and the vent chutes would be better ventilated than a passive prior art system has been able to ventilate, thus saving greatly in terms of heating and cooling costs. Further, the ability readily to use solar power and fan controller devices with such a system would contribute to its overall energy savings, efficiency and fan array longevity over main-powered solutions.

Further, there has developed a need to adequately ventilate roof structures along the entire ridgeline of the roof. And since different roof ridgelines are of different lengths, a ridge vent system should interconnect modular sections or segments of ridge vent materials to accommodate the longer and more complex ridges of today's modern roofs without adversely affecting performance of the system. Further, while it is desirable that a fan-powered ventilation system be designed for long life and functioning of the system, convenience of maintenance demands easy access from the rooftop to the fans employed therein for changing the fans when such become worn or fail to operate.

Still further, with the advent of today's more complex and contemporary roof structures, there are a variety of configurations of existing roofs that need to be easily accommodated with a retro-fitted solar-powered, active ridge vent system. Ideally, such a system would be adapted even for roofs part of which cover vaulted ceilings and part of which cover attic space. Since roofs are made with widely varying pitches from one roof to the next, and also involve dissimilar pitched sides of a single roof, there is a need for a ridge vent system that is easily adaptable to a large number of types of roofs with a minimum of need for customization of the ridge vent system to the particular new construction or retro-fitted roof.

Thus, there exists a need for a durable and easy to install ridge vent system that incorporates powered means, such as a fan array integrated into the ridge vent system itself, for enhancing ventilation capability to meet the needs of insulated roof systems.

SUMMARY OF THE INVENTION

In accordance with a first aspect of the invention, a roof ridge ventilation system, for ventilating at least one of an attic and a plurality of vent chute gaps between solid roof sheath and roof insulation, is provided comprising: a preferably elongated hood member comprising first and second ends and first and second edge portions; first and second preferably elongated vent members comprising first and second ends and inner and outer edge portions, the outer edge portions of said vent members adapted for engagement with the edge portions of the hood member for defining outer walls, each vent member comprising central wall means defining a central air flow channel and having defined therein air holes adapted to allow passage of air through the vent member. The system further comprises first and second preferably elongated base members comprising inner and outer edge portions, the inner edge portion of each base member being hinged respectively to the inner edge portions of each vent member so as to be adapted for installation on variously pitched roofs, each of the outer edge portions defining a wall, or gutter portion along the length of each base member, adapted for blocking wind from entering the air holes of the vent members such that the wind is caused to travel over the hood of the ridge vent system in a way that creates negative pressure which aids in drawing air out of the vent chutes through the ridge vent system. The wall, or gutter portion, at the outer edge portion of each base member also preferably provides drainage means, such as a plurality of holes at a base portion of the wall where the wall connects to or extends from the base member, for allowing rain water or condensation to drain from behind the wall adapted for blocking wind. Frame means is adapted for spanning an opening in the ridge portion of the roof, the frame means being for interconnecting the first vent member and the associated hinged first base member with the second vent member and its associated second base member. With the frame and hinge means, the vent and base members are adapted for being installed with one vent and base member combination on each side of the ridge portion of the roof. The system further comprises first and second end members adapted for attachment to each of the first and second ends of the vent members and the first and second ends of the hood member to further define the airflow channel adapted for passage of air from the opening in the ridge portion of the roof through the vent air holes.

In accordance with another aspect of the invention, in the roof ridge ventilation system of the present invention, the frame means is preferably adapted for retaining at least one fan member, and preferably a plurality of fan members, at, closely adjacent or above the ridge portion of the roof between the first and second vent members. Preferably, the frame means sits on, or is attached to, a ledge portion of the vent member formed along at least a portion of the inner edge of the vent member and adjacent the hinge member. In accordance with another aspect of the invention, preferably, the fan or fan members are powered by a solar-to-electric conversion means, for example comprising a photo-voltaic type solar collection panel, or an amorphous silicon, amorphous germanium, or nanocrystalline silicone thin-film solar cell type solar-to-electric conversion means, operatively connected to the fan member or members. Though the roof ridge ventilation system is preferably made of aluminum in a preferred embodiment, it will be appreciated by those of ordinary skill in the art that galvanized metal, plastic or other suitable materials, including but not limited to other metals, may be used to construct the invention without departing from the true scope of the invention as claimed.

Further, the roof ridge ventilation system preferably comprises a second wall on each of the base members and that is attached to, or extends from, the base member and preferably extends along the length of the base member, the second wall being adapted for preventing water from being blown into the hinge or hinges between the vent member and the base member. This second wall is thus adapted for preventing water from being blown upwardly along the base by the wind and into the opening at the ridge of the roof, in order to prevent water from getting into any of the vent chutes, roofing materials, insulation, attic or house. The second wall also preferably comprises an L-shaped attachment portion for attachment of each wall to the base member at a location beneath the vent member and the hood, the second wall for preventing blowing of water into the opening in the ridge also comprising drainage means, such as spaced holes defined near a base portion and the attachment portion of the second wall, for allowing drainage of condensate or other water to drain through and away from the second wall, down the base member and to the gutter or wall portion of the base member for blocking wind to allow drainage therefrom through drainage holes in the gutter or wall portion for blocking wind.

It will be appreciated with the first and other aspects of the invention that the pivoting means between the vent and base members may be a separate hinge member, such as a piano-type hinge, welded or otherwise attached to each the vent member and the base member, or alternatively, the hinge may be formed into the inner edge portion of each the vent member and the base member for interconnection by a rod member passing through eyelet portions of a hinge so formed.

The roof ridge ventilation system of this first and other aspects of the invention allows easy installation on the ridge area of roofs of different pitches, since the base portion of the system is pivotably hinged to the vent portion of the system. This alleviates the need for custom manufacture of the ridge vent system in order to allow adaptation to non-standard pitched roofs that would be cost prohibitive. This aspect of the invention also alleviates the need for adapting a non-hinged, for example sheet-metal type, ridge vent system to a higher or steeper-pitched roof, for example, by hammering or bending the sheet metal downwardly in order that it may sit flush with the ridge crest portion of the higher-pitched roof. This aspect of the invention also serves to reduce undesirable stresses that might otherwise exist on the solar panel that is mounted to the hood of the system, since it facilitates installation of the base of the system on variously pitched roofs without having to bend the base members relative to the vent and attached hood members.

Preferably, the roof ridge ventilation system of the first and other aspects of the invention come from the manufacturer with the base members and hinged vent members being already interconnected by the frame being spot-welded to the vent members. In this case, the roof ridge ventilation system may be easily installed as interconnected sides as received from the manufacturer. Alternatively, the system may be installed in stages from component parts using screws and bolts to interconnect the frame member to the vent members. Either way, the various elongated components may be more easily manufactured in longer lengths, allowing for cutting of lengths on the job for customizing the system to shorter ridge lines.

Thus, a preferred method of installation of the roof ridge ventilation system is provided wherein the elongated base and hinged vent members may come from the manufacturer interconnected by the frame member providing a base for one or more fan members, the frame member being spot-welded to the ledge in the base members or vent members. In such case, the roof ridge ventilation system is installed by nailing, screwing or otherwise attaching adjacent an opening at the ridge of a roof a pair of elongated base members, each base member of the pair being installedly on one side of the opening, each base member having hinged thereto an elongated vent member, the vent members being interconnected by frame means. The base members are evenly spaced from and along the opening at the roof ridge, with the opening positioned along a longitudinally extending centerline of the elongated pair of interconnected base members.

Alternatively, where the system comes from the manufacturer in component parts, the method of installation of the component parts may be as follows: an installer first lays down the base and hinged vent members of the system. This may be accomplished by nailing, screwing or otherwise fastening the base at a pre-determined distance from the opening at the ridge of the roof. The pre-determined distance from the centerline of the roof ridge for fastening the base may be determined using a cardboard or paper template measured as one half the width of the frame means. Accordingly, the outer edge of the ledge of the vent would be installed at the one half of the frame means distance from the centerline of the roof ridge such that the frame would fit onto the ledge upon installation. After the first base is installed in this way, the second base is likewise installed on the opposite side of the ridge line opening in the roof, each of the base and vent member combinations being installed with the hinged portion interconnecting the inner edges of the base and vent members being installed along and adjacent the opening in the ridge of the roof and the ledges being located at the predetermined distance from the opening in the roof so that the frame means will fit on the ledges. Still further, alternatively, the installer may lay out two sides of the ridge vent and install the frame, after which the integral unit may be centered along the ridge line as described in accordance with the preferred method of installation. Still further, a small touch of spray paint may be used together with a template to mark screw hole or nail locations for attaching the bases of the ridge vent system.

Continuing with the alternate method of installation, once the base and vent members are installed, a first part of the frame member is then installed, if it hasn't been installed already, so as to interconnect the vent members, with the frame member spanning the opening at the roof's ridge, to provide a frame or base for one or more fans to be optionally installed before installation of the hood and end members. The frame member is screwed or bolted to a ledge formed in either the base members, or to the central channel wall of each of the vent members to form a base on which fans or a fan tray may rest.

With either means of installation, if one or more fan members are to be installed on the frame, a second part of the frame member is installed with screws so as to fix the fan member or members to the first part of the frame member and between the two previously installed vent members. Installation of the first and second frame members may be suitably accomplished with nut and bolt combinations or a metal screw. Alternatively, the first part of the frame member may comprise a fan tray that rests on a ledge formed into the base members or the vent members, with the second part of the frame member being a strip of metal that is placed along the top of the fan housings with screw holes therein for screwing down the strip of metal so as to engage the top of the fan housings with the screw passing into the tray and ledge to secure the fans into place. As another alternative, a housing for retaining fan members may be formed into a central air flow channel of the vent members themselves. Still further, preferably, there are provided threaded studs welded or otherwise attached to the frame means and extending upwardly at various intervals for mounting fan housings on the threaded studs, the fan housings being secured on the threaded studs and the first frame means with the second frame means strip of metal being bolted into place on top of the fan housings in order to clamp the fans into place.

After the frame members and any fans are installed, the elongated hood member is then placed with the outer edges of the hood member being placed over the outer edges of the vent members. Preferably, the hood member has thereon an overhanging outer wall portion along the outer edge that engages outer edge walls of the vent members, the hood member resting on the outer edge walls of the vent members after installation. Screw holes are provided in the hood member and the vent member to allow installation of screws through the top of the hood member and through the vent member allowing for placement of a nut on the underside of the vent member to hold the hood in place on top of the vent member with sufficient force to withstand winds at the top of the roof ridge. Conventional means for sealing the screw holes, such as a rubber gasket in the hood member, may be employed as necessary. In this way the hood member is also readily removable to replace fans as would become necessary from time to time when fans are installed in the ridge vent system.

In accordance with another aspect of the invention, there is provided a roof ridge ventilation system housing a plurality of fans for effectively ventilating at least one of an attic and a plurality of vent chutes, the ventilation system comprising: a first elongated base member having inner and outer edges, the inner edge being adapted for pivotable interconnection along at least a portion of the length of the inner edge, the first base member having a wall for blocking wind formed therein along the length thereof adjacent the outer edge. A first elongated vent member of the system comprises first and second ends and inner and outer edges, the inner edge being adapted for pivotable interconnection and having a pivotably connected portion along at least a portion of the length of the inner edge of the first base member, the outer edge defining an airflow channel outer wall portion, the vent member defining a plurality of vent holes to allow for airflow through the vent member. The first vent member further comprises wall means for defining a housing and a central air flow channel along the length thereof adapted for allowing airflow to pass through the vent holes.

The system in accordance with this aspect of the invention further comprises a second elongated base member having inner and outer edges, the inner edge being adapted for pivotable interconnection along at least a portion of the length of the inner edge, the second base member having a wall for blocking wind formed therein along the length thereof adjacent the outer edge. A second elongated vent member comprises first and second ends and inner and outer edges, the inner edge adapted for pivotable interconnection and having a pivotably connected portion along at least a portion of the length of the inner edge of the second base member, the outer edge defining an airflow channel outer wall portion, the second vent member defining a plurality of vent holes to allow for airflow through the second vent member, the second vent member comprising wall means for defining a housing and a central air flow channel along the length thereof adapted for allowing airflow to pass through the vent holes.

The system in accordance with this aspect of the invention further comprises frame means retained in the central air flow channel housing and adapted for spanning the opening in the ridge portion of the roof. The frame means is adapted also for retaining at least one fan member, but preferably a plurality of fan members between the vent members and positioned directly above the opening in the ridge portion of the roof. The system further comprises a hood member having first and second ends, the hood member being adapted for covering the first and second vent members and adapted for further defining an upper wall for the airflow channel which, together with the first and second vent members, their respective airflow channel outer wall portions, vent holes and the wall means for spacing the vent members from the base members together define an airflow channel adapted for the passage of air from an opening in the ridge portion of the roof through the vent holes.

There are also provided first and second end members adapted for attachment to the first and second ends of the vent members, respectively, each end member also engaging, respectively, with the first and second ends of the hood member to further define the airflow channel adapted for passage of air from the opening in the ridge portion of the roof through the vent holes.

While preferably the roof ridge ventilation system of this aspect, and other aspects, of the invention is made of metal, it will be appreciated that other materials, such as plastic, may be used to form one or more elements of the system. Furthermore, preferably, the system comprises solar-to-electric conversion means operatively connected to each said fan member retained within the frame means of the system for powering the fan member.

Also, preferably, the roof ridge ventilation system of this aspect of the invention further comprises a wall adapted for preventing water from being blown into the pivotably connected portion between the vent member and the base member and hence adapted for preventing water from being blown into the opening at the ridge of the roof. Preferably, there is provided drainage means incorporated into the wall for blocking wind and in the wall for preventing water retained on the base member. This drainage means may suitably comprise the wall for blocking wind, and/or the wall for preventing water, each having an attachment portion for attachment to said base member, the walls having defined holes therein at a base portion thereof for drainage of water.

As with previous embodiments and aspects of the invention, there is provided frame means for interconnecting the vents and their interconnected base members and for retaining the fan or plurality of fans. In this way, a plurality of fans may be utilized integrated into the ridge roof ventilation system air flow channel itself and powered with a minimum of wiring by solar collection panels positioned near or on the ridge vent system of the invention.

In accordance with another aspect of the invention, there is provided an alternate embodiment of a roof ridge ventilation system housing a plurality of fans for ventilating a plurality vent chutes. This alternate embodiment of the invention comprises: a preferably elongated hood member comprising first and second ends and at least one edge wall portion; an elongated vent member comprising first and second ends, a central air flow channel portion adapted for communicating with an attic or at least one vent chute and an outer air flow channel portion adapted for engagement with the at least one edge wall portion of the hood member, the vent member having defined therein air holes adapted to allow passage of air through the air flow channels of the vent member, the vent member defining a housing portion within an air flow channel of the vent member and adapted for retaining a fan or a plurality of fans.

This alternate embodiment of the invention also comprises first and second elongated base members, each base member comprising first and second ends, an inner edge portion and an outer edge portion, the inner edge portion of each base member being connected to the channel portion of the vent member, the outer edge portion of at least one of the base members defining a wall adapted for blocking wind from entering the air holes of the vent member. As with previously described embodiments, an inner wall member located beneath the hood and adapted for preventing water from being blown into the opening at the ridge of the roof may also be provided attached to at least one of the base members in the event that hinge members are used to interconnect the vent member and the base member.

This alternate embodiment ventilation system also comprises first and second end members adapted for attachment to the first and second ends, respectively, of the vent member and the first and second ends, respectively, of the hood member to further define the airflow channel adapted for passage of air from the opening in the ridge portion of the roof through the vent member air holes. The alternate embodiment of the invention also comprises a fan or a plurality of fans, each fan retained within an airflow channel of the housing of the vent member.

For each aspect and embodiment of the invention described above, because the system is constructed of component parts, the hood member of the system in particular is easily removed for replacement of failed or failing fan members. The system thus enhances the ventilation capabilities of the fans to effectively ventilate the roof vent chute spaces and/or attic space as may be desirable. Being made of sturdy materials, the system not only resists damage by wind, but also prevents blowing of wind into the system that would negatively impact the airflow characteristics of the system and prevents water from being blown into the roof or the attic. This latter feature is important, since it is a goal of the system to reduce moisture in the roof, the roofing materials and the attic.

The various embodiments of the present invention provide an efficient means of ventilating all of the vent chutes, or an attic space, of a structure along the entire length of the ridge of the roof, or alternatively space under a roof having both vent chutes and attic space, each at different locations under the roof. Installed on a typical pitched roof, the roof ridge ventilation system creates an incentive for air to flow from intake ports or soffit vents underneath the eaves of the roof to flow upwardly, preferably, but optionally, with the assistance of fans retained in the housing of the roof ridge ventilation system itself, through the vent chutes of the roof and out the opening at the ridge of the roof. Thus, the air is encouraged to flow up through what might be seen as a throat portion of the ventilation system and out through the vent holes via a channel defined by vent members, the hood member and end member portions of the invention.

Such a ventilation system will maintain a cooler and moisture-free target space for ventilation during warm periods and a moisture-free target space for ventilation during cool periods. This will effectively counteract the many moisture-generating aspects of today's modern structures that can damage roofing materials, including showers, sink basins, dish washing machines, laundry facilities, naturally occurring condensation and other moisture-generating systems.

In the event of lack of wind to ventilate the vent chutes of the structure, or an attic, fans may be used to create air flow from intake at soffit vents, through the vent chutes and out through the roof ridge ventilation system. Conversely, in the event of a fan failure, the natural air flow of rising warm air assisted by a negative pressure differential created by any wind blowing generally transversely over the top of the roof ridge ventilation system, aids ventilation by pulling some air through the soffits and the vent chutes to serve as a redundant system to provide backup ventilation in the event of such failure.

Still further, the system of the invention provided is efficient, as a plurality of smaller fans are easily operated with solar-to-electric power conversion means, and the fans are easily accessible from the roof through the hood, by removal of readily accessible screws for removal of the hood and easy access to any failed fans. Since the fans are all located in close proximity to each other under the hood of the roof ridge ventilation system of the present invention, they are easily wired to solar collection means employed on or near an outer surface of the hood of the ventilation system.

Proper ventilation of a roof's vent chutes with the present invention minimizes the transfer of heat from the roof to the rest of the structure, especially during warmer periods. While the present invention includes both active and passive ventilation aspects and embodiments, active ventilation of the vent chutes with a fan-assisted ventilation system is the most effective means of cooling a vaulted ceiling structure and of preventing moisture buildup in the roofing materials, in that such ventilation creates a uniform and consistent airflow along the location where ventilation is needed most, along the underside of the solid sheath. Proper ventilation of the vent chutes of a roof creates a thermal insulation barrier preventing radiation of heat into the structure and helps prevent "hot spots" that otherwise would develop under the roof's solid sheath and that would reduce the effectiveness of the venti- lation means leading to reduced roof life. While the primary application of the present invention is to actively ventilate the vent chutes of a vaulted ceiling roof, of course, the present invention is also readily adaptable to actively, or passively, ventilate attic or other spaces of a structure.

The subject matter of the present invention is particularly pointed out and distinctly claimed in the concluding portion of this specification. However, both the organization and method of operation, together with further advantages and objects thereof, may best be understood by reference to the following descriptions taken in connection with accompanying drawings wherein like reference characters refer to like elements.

DETAILED DESCRIPTION

Figure 7A:
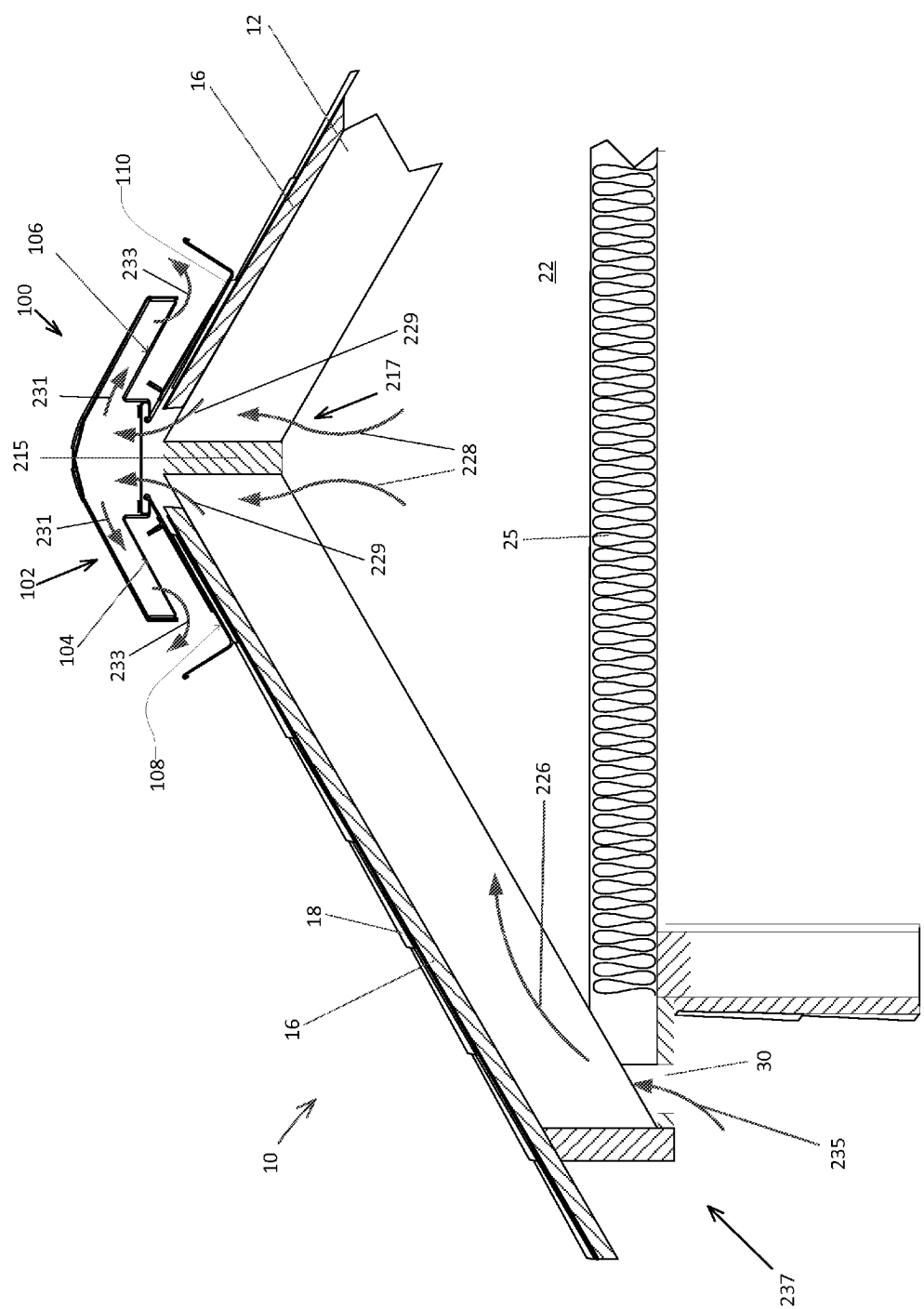
FIG. 7a is a partial cross section illustration of airflow through part of an attic space under a typical roof having a roof ridge ventilation system in accordance with the present invention installed on the roof.
Figure 7B:
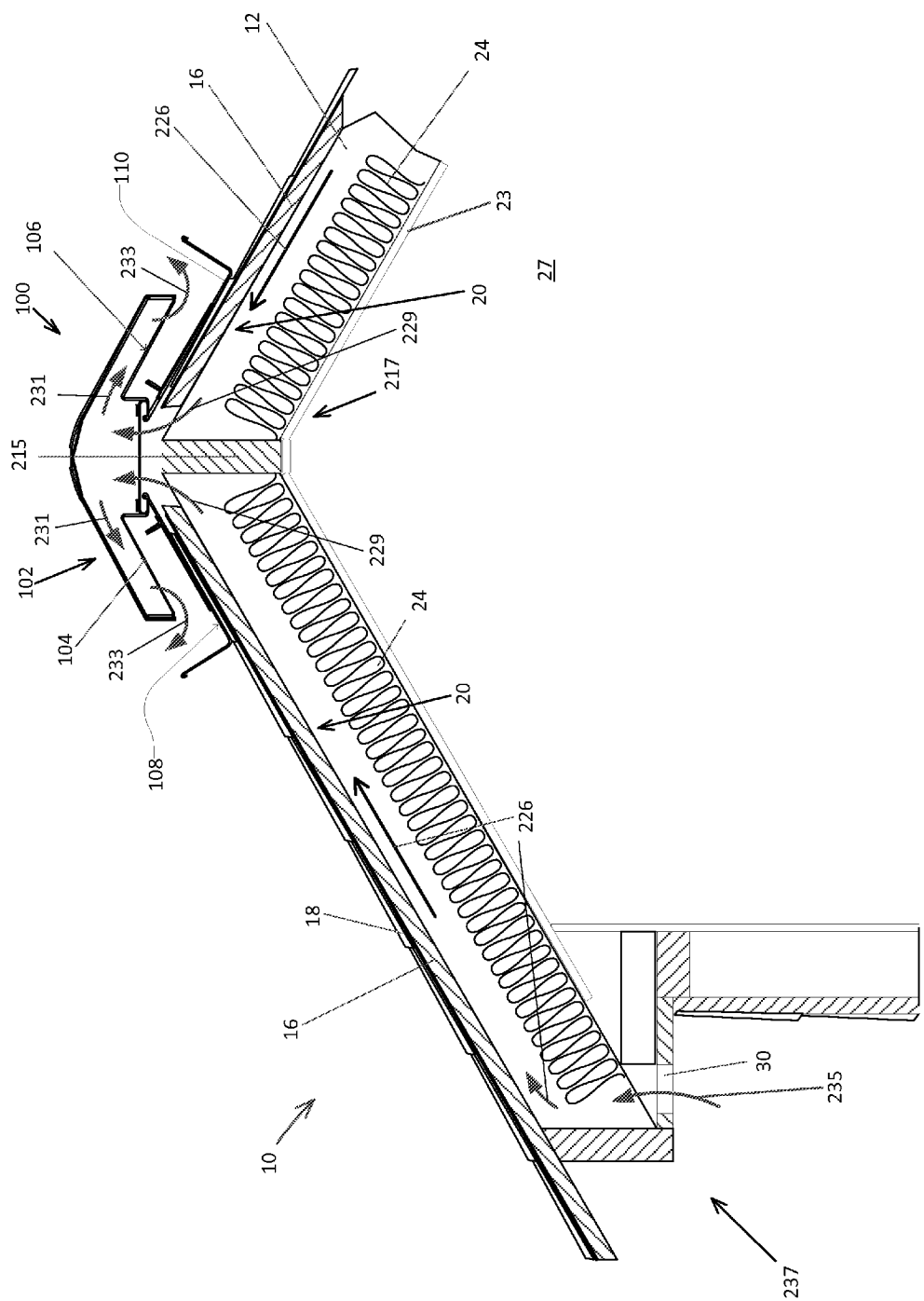
FIG. 7b is a partial cross section illustration of airflow through part of a vaulted or cathedral ceiling roof having a roof ridge ventilation system in accordance with the present invention installed on the roof.
Figure 7C:
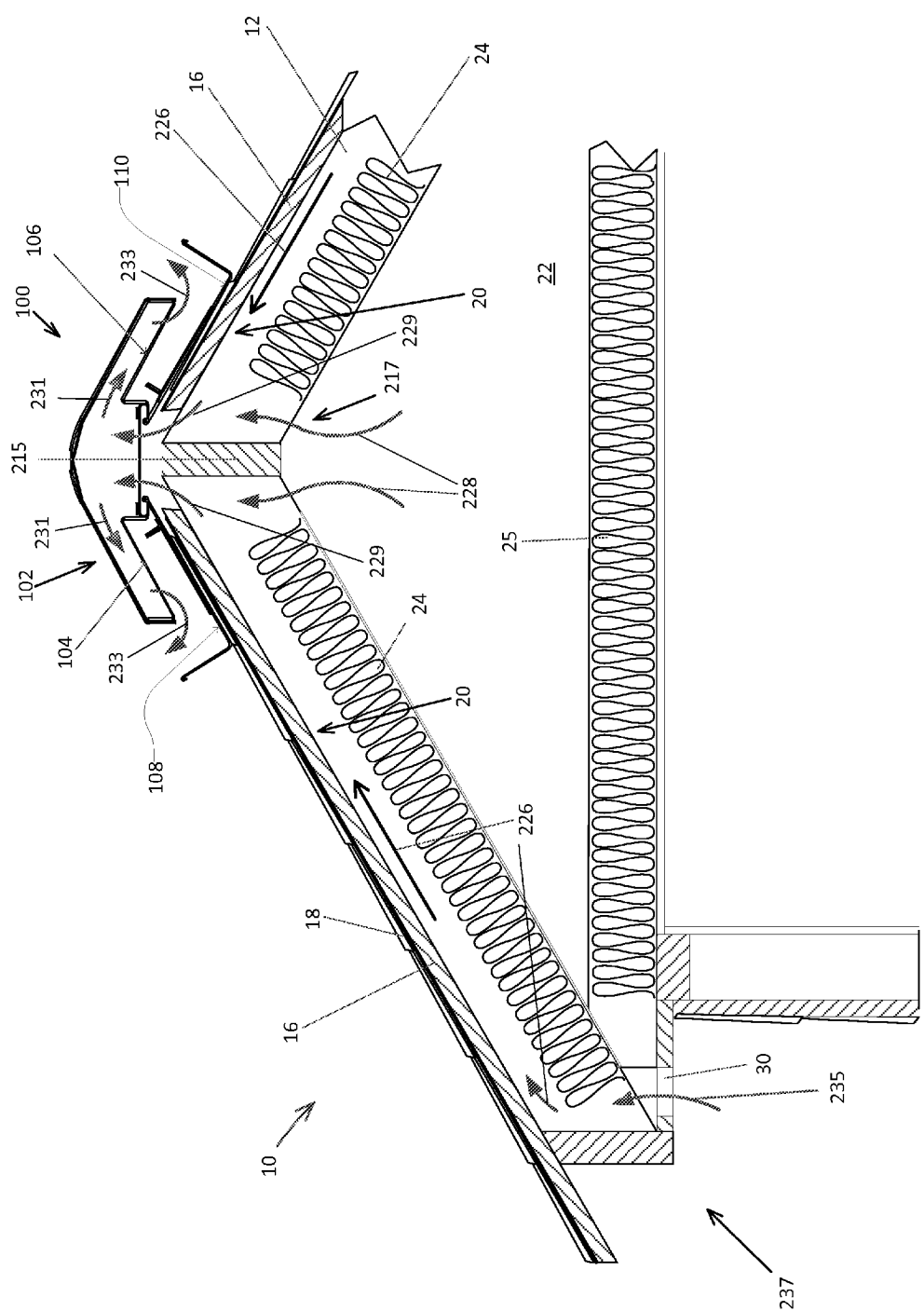
FIG. 7c is a partial cross section illustration of airflow through part of attic space and part of vent chute space under a typical roof having a roof ridge ventilation system in accordance with the present invention installed on the roof.

Referring to FIGS. 7a-c, roofs 10 are shown, roof 10 of FIG. 7a covering an attic space 22, roof 10 of FIG. 7b covering a vaulted or cathedral ceiling (hereafter referred to as vaulted ceiling) and roof 10 of FIG. 7c covering an attic space 22 but in the less common situation where there is encountered both attic floor insulation 25 as well as roof insulation 24 so that there are vent chutes 226 as shown.

Each roof 10 is composed of structural members, such as rafters 12 joined together so as to form a peak or ridge portion 217 shown in the figures having a beam 215. On either side of the ridge 217 there are typically fastened sheets of plywood 16 serving as a base or solid sheath 16 for installing, as by nailing, roofing material, such as shingles, shakes and the like (all represented by 18).

As shown in FIGS. 7b and 7c, on the underside of the typically plywood solid sheath 16, there is defined between the rafters 12 an air gap 20, or in actuality a plurality of air gaps 20, an air gap being defined between each set of rafters 12 and insulation material 24. Insulation material 24 is installed between the rafters 12, preferably with the air gaps 20 existing between the insulation material 24 and the plywood 16, and the insulation material is typically comprised of fiberglass having a backing for nailing sheets of the insulation to the underside of the rafters, or cellulose fiber that may be blown into containment systems installed between the rafters in a manner known in the art. As shown in FIG. 7a, often there are not vent chutes defined by insulation between the rafters, as in the situation where there is attic space.

It will be appreciated by those of ordinary skill in the art that many structures are comprised of both attic space in one part of the home and vaulted or cathedral ceiling space in another part of the home. Further, it will be appreciated that there may be attic space on one side of a beam at the peak of a structure and vaulted ceiling space on the other side of the beam. In any case, it will be apparent that the system of the invention may be easily adapted to whatever such configuration may be encountered.

Ventilation air flow shown by arrows 226 through the air gaps 20 in FIGS. 7b and 7c, known as vent chutes 20, and ventilation of the attic shown by arrows 228 as shown in FIGS. 7a and 7c, are objects of the various embodiments of the invention. Ventilation of the vent chutes 20 serves to cool the roof 10, any attic space 22 and the house, such as at vaulted ceiling space 27 shown in FIG. 7b, and also serves to reduce moisture in the vent chutes which can lead to mold and mildew accumulation in the vent chutes, any attic space, and in the house itself.

As shown in FIG. 7b, the airflow channel 226 is supplemented and provided with soffit vents 30 retained typically on the underside of the eaves 237 in the roof 10. Airflow thus is provided for the roof through the soffit vents 30, upwardly in the vent chute channels 20 provided between the insulation 24, the underside of plywood 16 and the rafters 12 in communication with an elongated opening in the roof at the ridge portion 217 of the roof 10. Thus the airflow channel 226 feeds into the airflow as shown at 229, 231 and 233. In the case of an attic as shown most commonly as in FIG. 7a, the airflow shown at 228 is supplemented and provided with soffit vents 30 for feeding upwardly as shown at 229, 231 and 233.

Referring to FIGS. 1-9, part of a roof ridge ventilation system 100 is shown in accordance with a first aspect of the invention comprising an elongated hood or cap member 102, elongated vent members 104, 106, elongated base members 108, 110, and preferably interconnecting frame means 112. The aforementioned members are elongated in the sense that they are adapted for installation along the length of a ridge opening in a roof, the vent system 100 being symmetrical, in a preferred embodiment, about an axis running longitudinally along and parallel with a center line positioned along the ridge of the roof. The vent hood member 102 comprises an arched center portion with a peak 114 with upper panels 116, 118 and outer edge wall portions 120, 122. The vent hood member 102 is elongated sufficiently to cover a longer section of a roof ridge line. The hood member 102 of the ventilation system 100 is preferably constructed of a single piece of metal, such as sheet metal, or alternatively plastic, bent to form the portions described.

Figure 6:
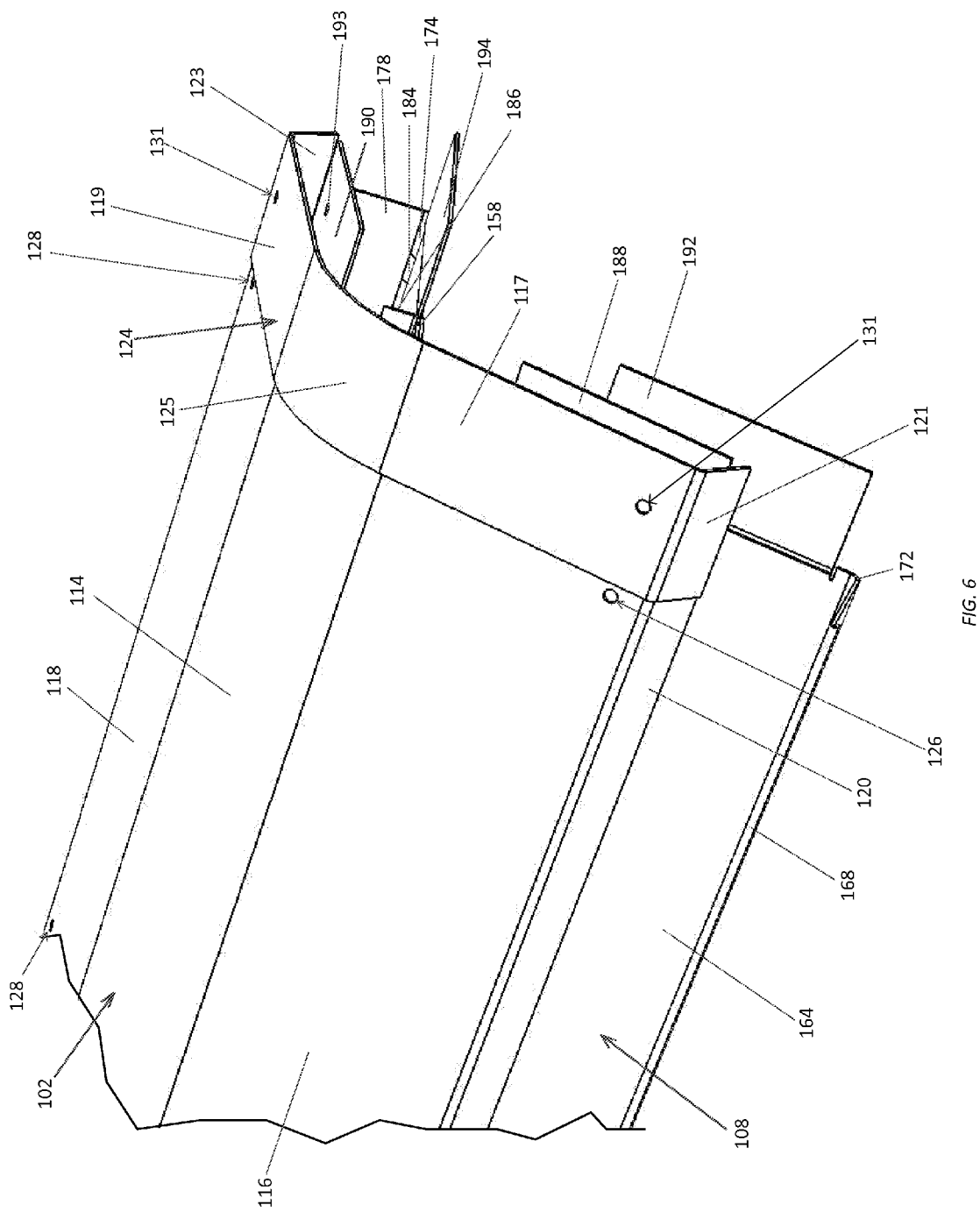
FIG. 6 is a perspective view of the ventilation system portions of FIG. 5 further comprising segment interconnection flanges and a hood member having a hood member interconnection flange.
Figure 13:
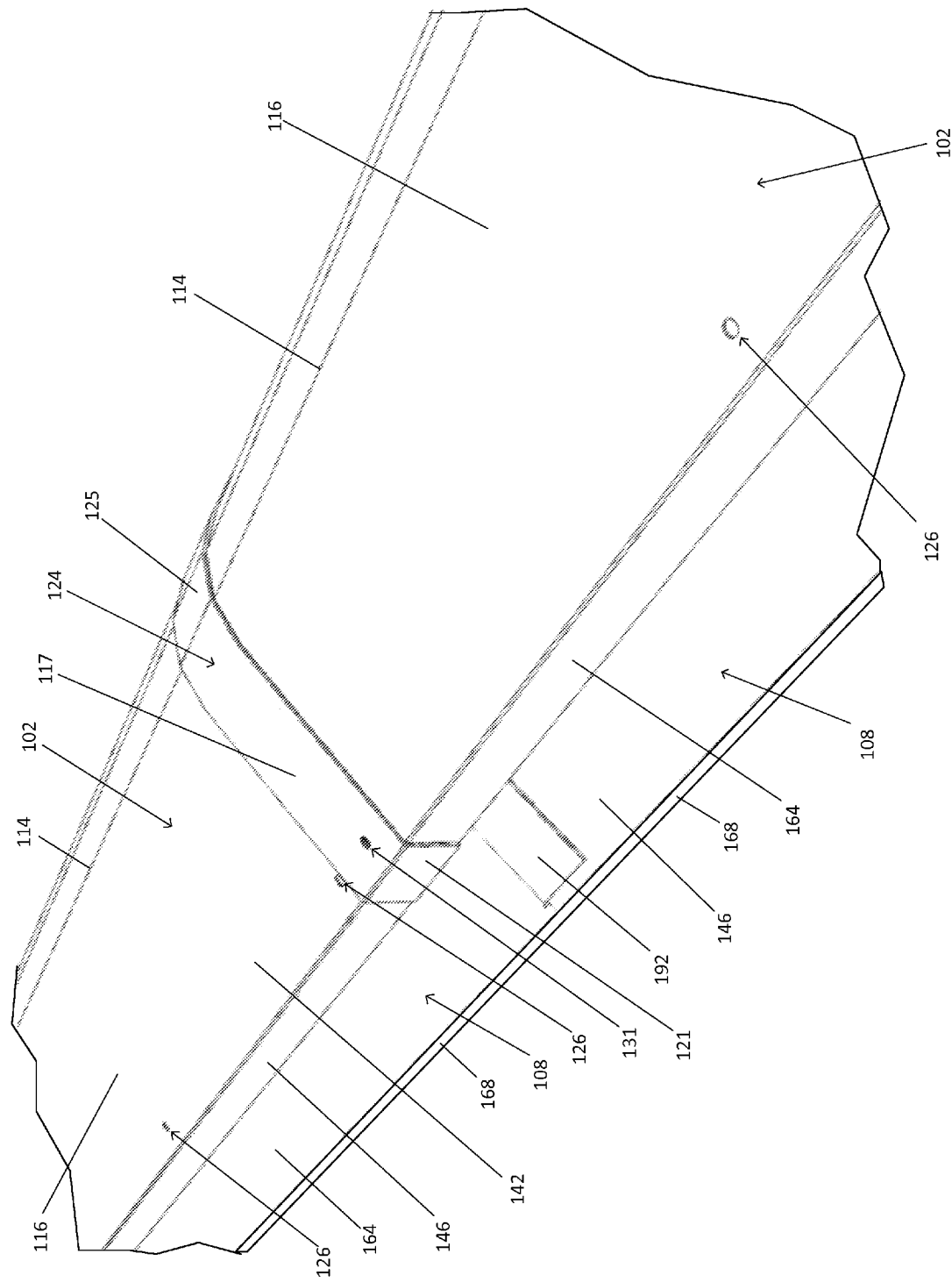
FIG. 13 is a partial perspective view of abutted, adjoined flanged and non-flanged end portions of roof ridge ventilation systems in accordance with the invention.

For roof ridge lines that are longer than, for example, a standard length ridge ventilation system 100 of eight feet, or four feet, in length, a vent hood member interconnection member or tab 124 enables interconnection of two or more vent hood members 102 of ridge ventilation sections 100 together to form a longer roof ridge ventilation system 100 as shown particularly in FIG. 13. As shown in FIG. 6, the vent hood member interconnection member or tab 124 has a corresponding peak 125, upper panel sections 117, 119 and outer edge wall tab portions 121, 123, all for mating with their respective counterpart portions of the vent hood member 102. The vent hood member interconnection member or tab 124 is preferably spot-welded to the vent hood member 102.

The vent members 104, 106 each comprise a ledge portion 130, 132 along an inner edge 134, 136 (see FIGS. 1 and 4) of each vent member. At approximately a right angle to the ledge portion 130, 132, there extends a channel wall 138, 140, or throat piece, for further defining the channel of the air passageway from the ridge line opening in the roof into the vent members 104, 106. At approximately an 80 degree to a 90 degree angle to the channel wall 138, 140, there extends a vent channel floor 142, 144 for further defining the channel of the air passageway from the ridge line opening in the roof. The vent channel floors 142, 144 terminate at an end wall portion 146, 148, the end wall portions being sized so as to fit within the outer edge wall portions 120, 122 of the vent hood member. Adjacent the outer end wall portions 146, 148 there are defined a plurality of air flow holes 150, 152, or openings, in the vent channel floors 142, 144, respectively, for allowing passage of the air from the vent members 104, 106 out to the outside air. The vent holes 150, 152 are on the underside of the vent so that rain water will not be able to get into the ventilation system, and they are of sufficient size to allow adequate ventilation of the air space required to be ventilated without undue strain on the fans of the system. Each vent member 104, 106 is preferably constructed of a single piece of sheet metal, or alternatively, plastic, bent to form the portions described and in which holes are cut to form the airflow holes 150, 152.

The vent hood member 102 has a plurality of screw holes 126, 128 defined in upper panels 116, 118, respectively, and the vent members 104, 106 each have corresponding screw holes 109, 111 in the channel floor members 142, 144, adjacent air flow holes 150, 152, the bolt or screw holes being adapted for receipt of bolts or screws (not shown) provided for attachment of the hood member to the vent members 104, 106, respectively, upon installation of the vent hood member. Thus, preferably, there is a plurality of sets of airflow vent holes 150, 152 with a bolt hole 109, 111 being provided in non-vented portions 154, 155, respectively, of the vent channel floor member 142, 144, the screw holes being adapted to receive the bolt from the hood member 102 through the vent members 104, 106. A plurality of nuts (not shown) are employed adjacent the underside of the vent members 104, 106, more specifically at locations 154, 155 of vent channel floor members 142, 144, for threaded engagement with the bolts to hold the hood member 102 in place with the edge walls 120, 122 of the hood member capping in overlapping fashion the outer edge walls 146, 148 of the vent members 104, 106, respectively. The nuts may be spot-welded to the underside of the vent floors 142, 144 to facilitate easier installation.

Figure 12:
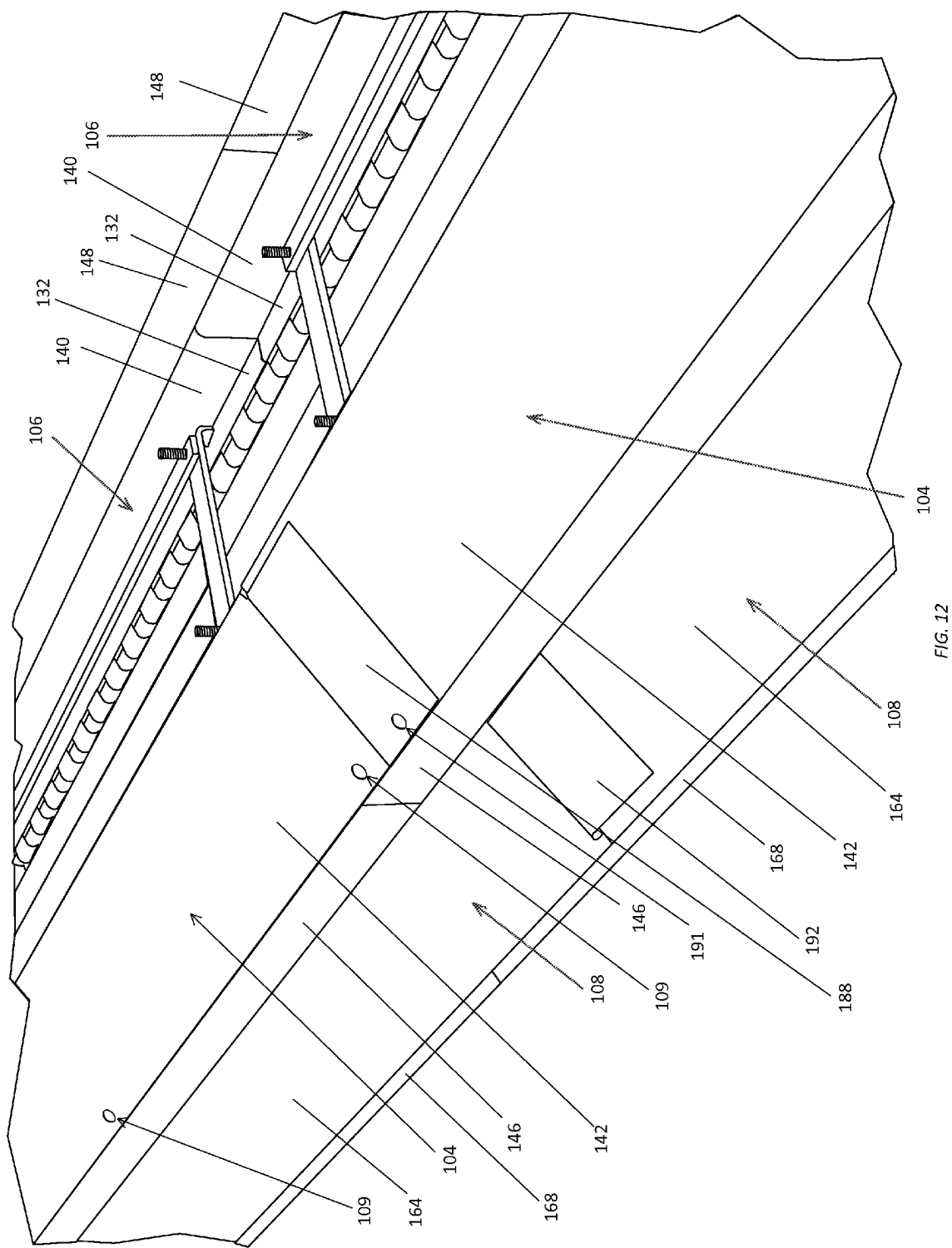
FIG. 12 is a partial perspective view of end-to-end abutted, adjoined flanged and non-flanged ends of elongated hinged vent and base portions of partial roof ridge ventilation systems in accordance with the invention.

Each vent member 104, 106 has shown attached to it an extension tab or flange 188, 190 for assisting with interconnecting two sections of vent members, end-to-end, to extend them along the length of the roof. Each extension flange 188, 190 has defined therein a bolt hole 191, 193. Bolt holes 191, 193 align with the end most bolt holes 109, 111 to allow interconnection of the vent member 104, 106 portions end-to-end with nuts and bolts as previously described to allow extending the length of the vent 102 for longer than eight foot roof ridgelines. Flanges 188, 190 are preferably formed as raised-edge tabs extending integrally from vent floors 142, 144, with there being stamped into the interconnecting edge of the flanges and the vent floors an L-shaped bend such that the flange is raised a sufficient height to allow receipt of a non-flanged end (See FIG. 4) of a vent member underneath the flanges when two vent members (e.g., two vent members 104) are joined abutted end-to-end as shown in FIG. 12. As such, as shown in FIG. 12, when flanged ends of the vent members 104, 106 and non-flanged ends of the vent members abut, walls 146 and walls 148 abut end-to-end to form a contiguous outer wall portion of the airflow channel. Similarly, abutting non-flanged and flanged ends of vent members 104, 106 cause floor members 142, 144 to form a contiguous floor portion of the air flow channel and further cause central channel walls 138, 140 to form a contiguous central airflow channel wall. Still further, abutting non-flanged and flanged ends of vent members 104, 106 form contiguous ledge members 130, 132, all contiguous from one vent member 104, 106 to the next, abutting, vent member.

It will be appreciated by those of ordinary skill in the art that, since the same ridge vent system 100 may be used to ventilate either attic space or vent chutes, or more rarely both, a single ridge vent system may extend the length of a single ridge that spans linearly aligned portions of roof that covers adjacent vaulted ceiling (vent chute) portions of a house and attic portions of a house. Also, the ridge vent system 100, or alternatively 100" (see FIG. 11), may be used to ventilate just one side of a roof covering a vaulted ceiling, while an attic on the other side of the roof may be otherwise vented. Thus, it will be appreciated that a combination of ridge vent system systems 100, 100' (see FIG. 10) and/or 100" may be combined to meet various roof ridge ventilation needs as they arise.

Figure 8:
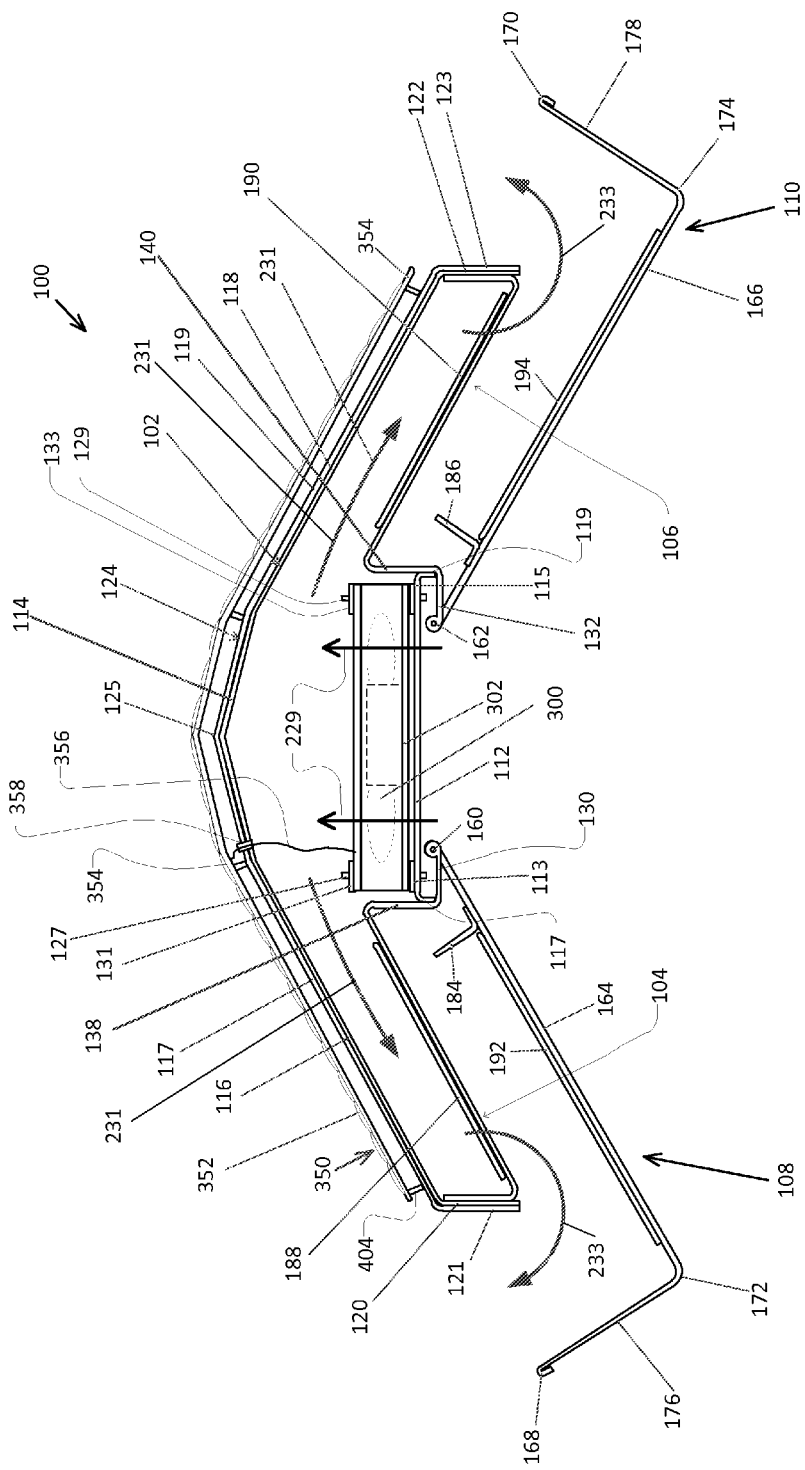
FIG. 8 is an end view of part of a roof ridge ventilation system not having an end member installed and in accordance with an embodiment of the invention.

Base members 108, 110 comprise inner edge portions 156, 158 along the length of which there is provided hinge members 160, 162 for pivotably interconnecting the inner edge portions 156, 158 of the base members 108, 110 with the inner edge portions 134, 136 of each vent member 104, 106. Hinge members 160, 162 preferably comprise piano-type hinges, each of which further comprise attachment plates 159, 161 (for hinge member 160) and 163, 165 (for hinge member 162). From the hinges 160, 162, the base members 108, 110 extend in a plane to form a base floor portion 164, 166 that is designed to be in a plane that is adjacent and parallel with the surface of the roof, the floor portion of the base member also being designed to allow nailing or screwing of the base to the exterior shingles or shakes of the roof. Base floor portion 164 is preferably spot-welded to attachment plate 159 of hinge 160, and base floor portion 166 is preferably spot-welded to attachment plate 163 of hinge 162, each being preferably spot-welded at a plurality of locations along the length of the respective hinge attachment plates. As shown in FIG. 8, it will be appreciated by those of ordinary skill in the art that portions of the hinges 160, 162 may be integral with the ledge portions 130, 132 and the inner edge portions 134, 136 of the base members 108, 110 as is well known in the art, and employment of such would not depart from the true scope and spirit of this invention.

The base floor portions 164, 166 are bent upwardly at substantially right angles near outer edges of the base floor portions at 172, 174 to form a wind block wall portion 176, 178, or gutter, for preventing wind from blowing up the surface of the roof, over the base floor portions 164, 166 and into the vent member holes 150, 152. The wind block wall portions 176, 178 of the base members 108, 110, respectively, terminate at outer edges 168, 170. At the outer edges 168, 170 of the outer wall portions 176, 178, there are formed folded-over edges (168, 170), formed as by sheet metal bending, to minimize what would otherwise be a sharp edge on which an installer or other person working on a roof could be cut.

At the bended areas 172, 174 of the base members 108, 110 there are defined a plurality of holes 180, 182 for allowing drainage of water from rain, or condensation, from off of the base members and onto the surface of the roof. Each base member 108, 110 is preferably formed from a single portion of sheet metal, or alternatively plastic, bent to form the portions described and in which drainage holes 180, 182 are stamped or otherwise cut.

Adjacent and below the hinges 160, 162, but well underneath an overhang created by the vent members 104, 106, there is attached to the base floor portions 164, 166 another wall 184, 186 for preventing blowing of moisture up along base floor portions into the hinges 160, 162, thus preventing moisture, including condensate, from being introduced into the roof or attic. Walls 184, 186 are preferably made of an elongated piece of metal bent to form an L-shaped attachment tab for spot-welding the wall to the base floors 164, 166, respectively along the length of base floors adjacent the edges 156, 158 of the base floors and adjacent attachment plates 159, 163. Adjacent the location of attachment of the walls 184, 186 to the base floors 164, 166, there are defined a plurality of holes 185, 187 for drainage of condensation, or other liquid, that may form or be present behind the walls 184, 186.

Each base member 108, 110 has attached to it an extension tab or flange 192, 194 for assisting with abutting two base members together, end-to-end, to allow extending the base members to accommodate a longer roof ridge line. Each flange 192, 194 creates an overlap that serves, in effect together with the roofing shingles to provide a sleeve for receipt of a non-flanged end of the base members 108, 110 to allow interconnection of two base members respectively, end-to-end. Flanges 192, 194 are preferably formed as raised-edge tabs extending integrally from base floor portions 164, 166, with there being stamped into the interconnecting edge of the flanges and the base floor portions an L-shaped bend such that the flange is raised a sufficient height to allow receipt of a non-flanged end (See FIG. 4) of base floor portions underneath the flanges when two base members (e.g., two base members 108) are joined abutted end-to-end as shown in FIG. 12 and installed on a roof.

When flanged ends of the base members 108, 110 and non-flanged ends of the base members abut, walls 176 and walls 178 abut end-to-end to form a contiguous outer wall wind block/gutter portion of the base member. Similarly, abutting non-flanged and flanged ends of base members 108, 110 cause floor portions 164, 166 to form a contiguous floor portion of the base members to allow securing of each of the base members to the roof, to provide a surface for rain water to run down to the wind block/gutter portions 176, 178 and out the holes 180, 182 onto the roof. Thus, during installation, as each base member 108, 110 is nailed or screwed to the roof exterior, the non-flanged ends of the next abutting base member 108, 110 (and likely hinged vent members 104, 106) are caused to slide under the flanges 192, 194 (and 188, 190 of the vent members 104, 106) such that the flange members all help to hold the next abutting ridge vent portions in place.

Further, and similarly, as abutting base members 108, 110 are brought together during installation, inner wall members 184, 186 likewise abut end-to-end to form a contiguous wall member to prevent water from being blown up the floor portions 164, 166 and into the hinges 160, 162.

Figure 14:
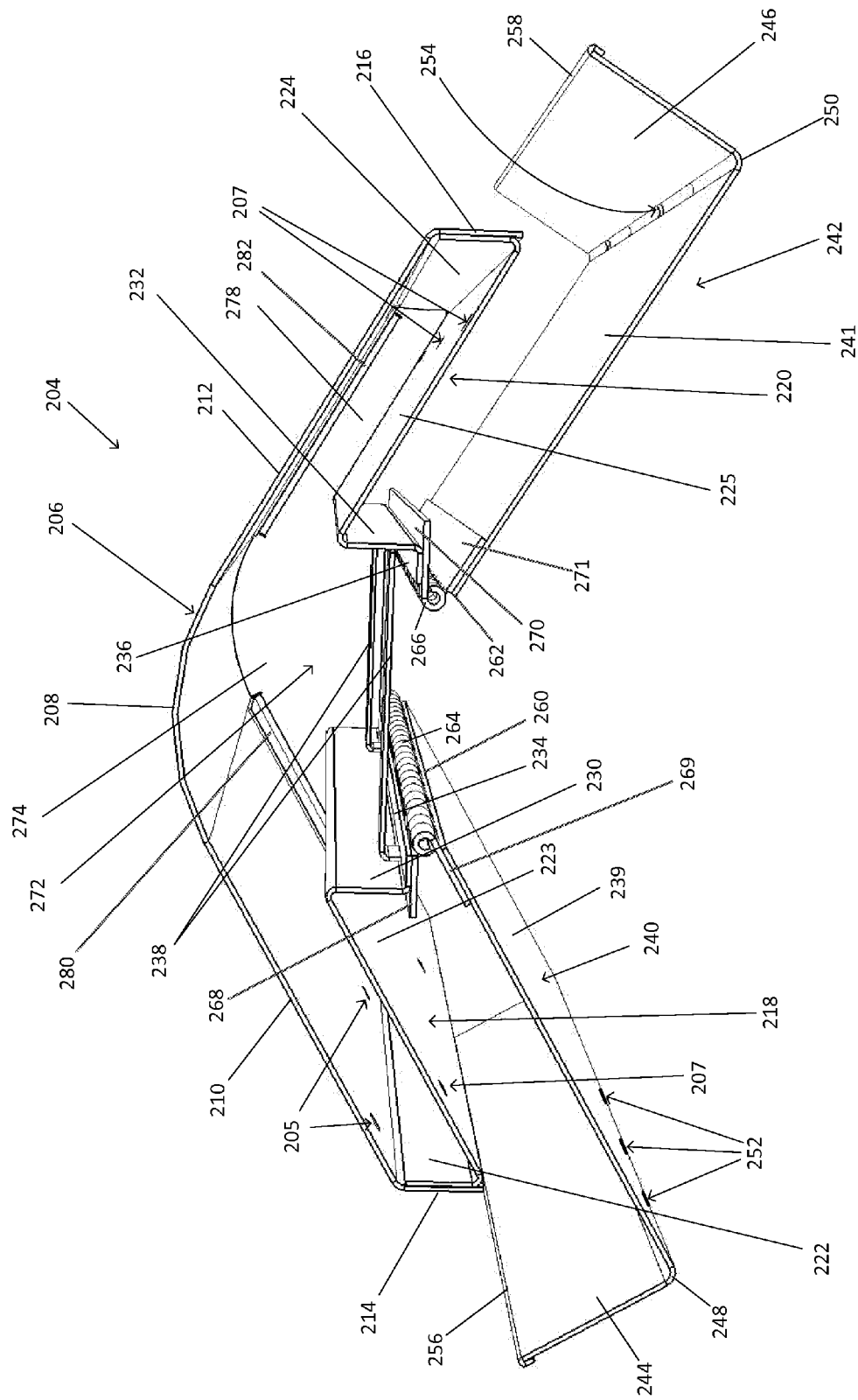
FIG. 14 is a perspective view of a "dummy" end-cap for a roof ridge ventilation system in accordance with the invention.

As shown in FIG. 14, an end cap, otherwise known as a "dummy" segment 204 (generically also referred to as an end member), of a ridge vent system is provided for the ultimate end of the ridge vent 100. End cap 204 comprises a hood portion 206 further comprising a peak portion 208, contiguous panel portions 210, 212 and contiguous outer wall portions 214, 216. The hood portion 206 of the end cap 204 serves as an upper enclosure for the end of the ridge vent air channel. The peak portion 208 of the end cap 204 abuts and engages the peak portion 114 of the hood member 102 to enclose the end of the hood member at that location. The panel portions 210, 212 of the end cap 204 abut and engage the hood member upper panel portions 116, 118, and the outer wall portions 214, 216 abut and engage the outer wall portions of the hood member 102, end-to-end, all in much the same way as described previously when two hood portions 102 of vent members 100 are abutted end-to-end with an interconnecting member 124. Thus, an interconnecting member 124 is used to interconnect the hood portion 206 of the end cap 204 and the hood portion 102 of the vent member 100 such that the various parts of the hood member abut and engage as previously described. The hood portion 206 of the end cap 204 is preferably constructed of a single piece of sheet metal, or alternatively plastic, bent to form the portions described.

The end cap 204 further comprises dummy vent members 218, 220 having outer wall portions 222, 224, floor portions 223, 225, inner channel wall portions 230, 232, and ledge members 234, 236. The dummy vent member portions described are also interconnected via frame means 238. Each vent member 218, 220 is preferably constructed of a single piece of sheet metal, or alternatively, plastic, bent to form the portions described.

The hood portion 206 of the end cap 204 has defined therein holes 205 for alignment with holes 207 in the dummy vent members 218, 220 to allow placement of a bolt (not shown) with a nut (not shown) to be installed adjacent the underside of the floor portion of the vent members to hold the hood portion and the vent members together. Again, the nut may be spot-welded to the underside of the dummy vent members 218, 220 for ease of installation. The holes 205, 207 also align with corresponding holes 131 in an interconnecting member 124, as well as holes 191, 193 in vent flanges 188, 190 for allowing interconnection of the end cap 204 with bolts through the holes in the end cap, the interconnecting member, the holes 126, 128 in the abutted interfacing hood member 102 and the holes in the vent flanges.

The end cap 204 also comprises base members 240, 242 having base floor members 239, 241 terminating in outer wall portions 244, 246 formed at substantially right angle bends 248, 250 to the base floor members and having drainage holes 252, 254 being formed therein at the bends. At outer edges of the outer wall portions 244, 246 of the base members 239, 241, there are formed folded-over edges 256, 258, formed as by sheet metal bending, to minimize what would otherwise be a sharp edge on which an installer or other person working on a roof could be cut. Each base member 240, 242 is preferably formed from a single piece of sheet metal, or alternatively plastic, bent to form the portions described. Since there wouldn't be an opening in the roof ridge adjacent the dummy end cap 204, there isn't a need for fans to be installed in the end cap and there isn't a need for an inner wall such as wall 184, 186 on base members 108, 110. Further, walls 244, 246 of end cap 204 are mostly for appearance purposes, since there are no openings in the end cap to prevent wind blowing into such as vent holes 150, 152 in vent members 104, 106.

Base members 240, 242 comprise inner edge portions 260, 262, respectively, along the length of which there is provided hinge members 264, 266, respectively for pivotably interconnecting the inner edge portions of the base members with the ledge portions 234, 236 of each vent member 218, 220, respectively. Hinge members 264, 266 preferably comprise piano-type hinges, each of which further comprise upper and lower attachment plates 268, 269 (for hinge member 264) and upper and lower attachment plates 270, 271 (for hinge member 266) for allowing interconnection preferably by spot-welding of the hinges to the ledge portions 234, 236 and inner portions 260, 262 of the base members 240, 242. Thus, like the hinges 160, 162 of the roof ridge vent system described previously, the hinges 264, 266 allow easy installation of the end cap 204 on the ridge of a roof, regardless of the pitch of the roof.

Figure 1:
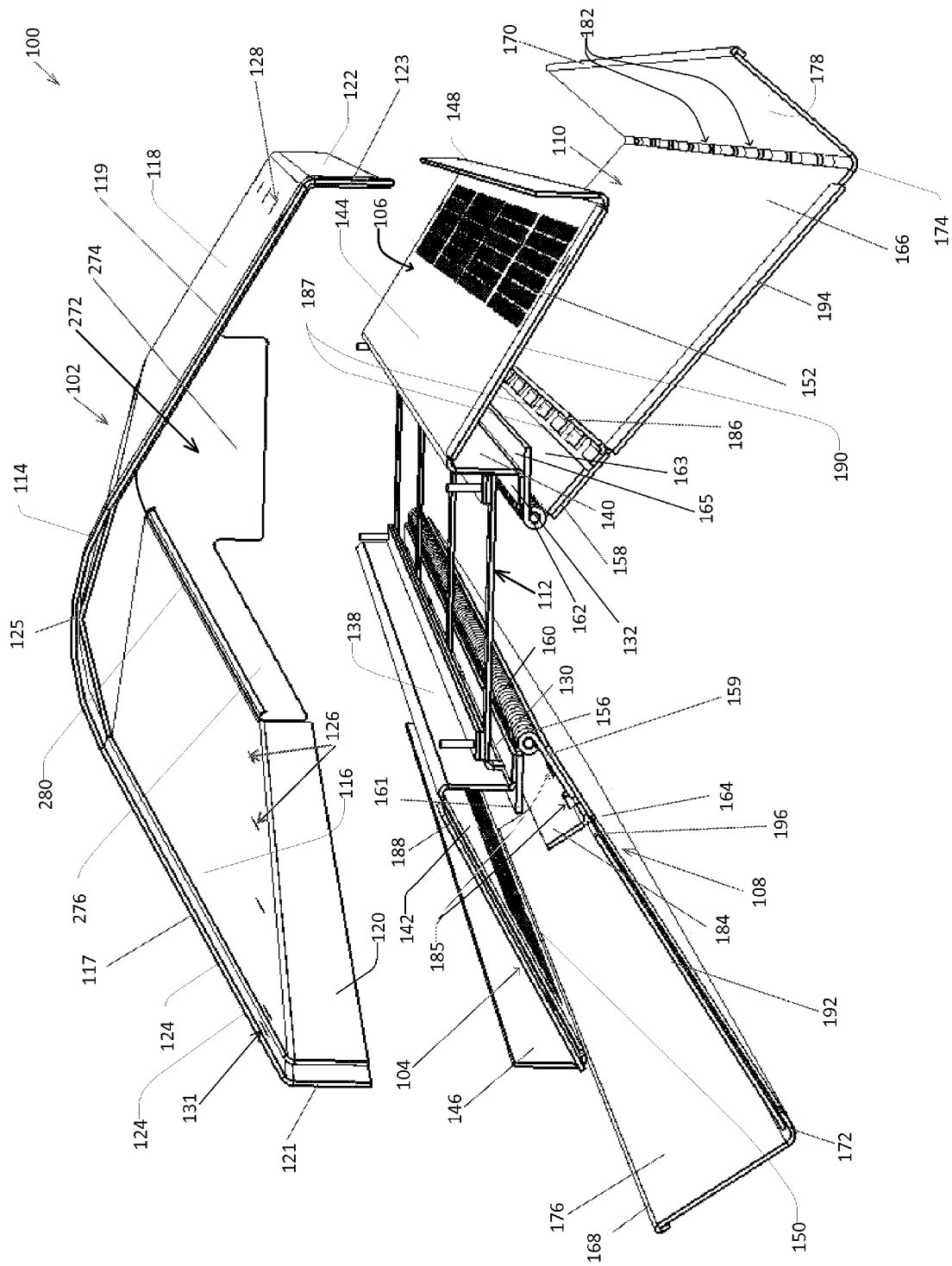
FIG. 1 is a perspective view of part of a roof ridge ventilation system in accordance with one embodiment of the invention.
Figure 2:
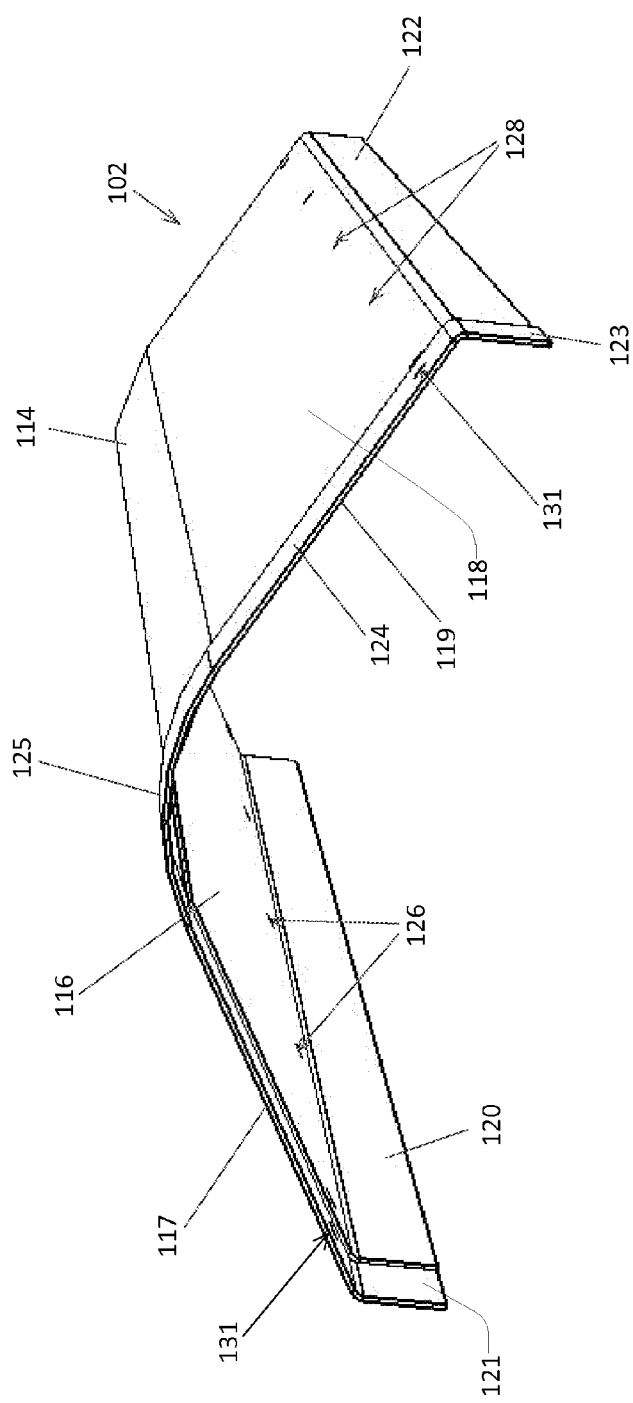
FIG. 2 is a perspective view of a hood member and a flanged interconnection portion of the partial roof ridge ventilation system of FIG. 1.
Figure 3:
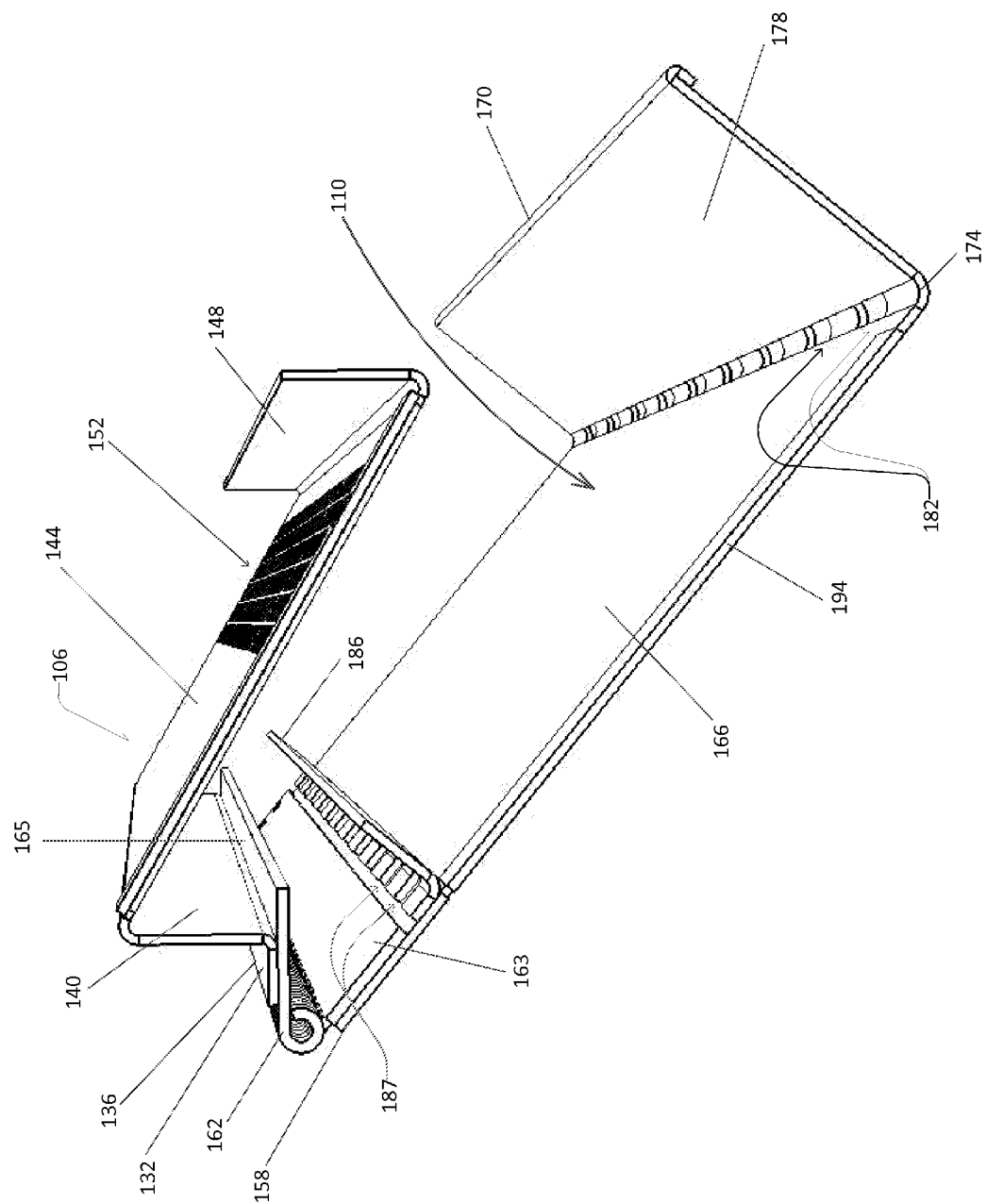
FIG. 3 is a perspective view of flanged ends of hinged base, gutter, vent and interconnection portions of the partial roof ridge ventilation system of FIG. 1.
Figure 4:
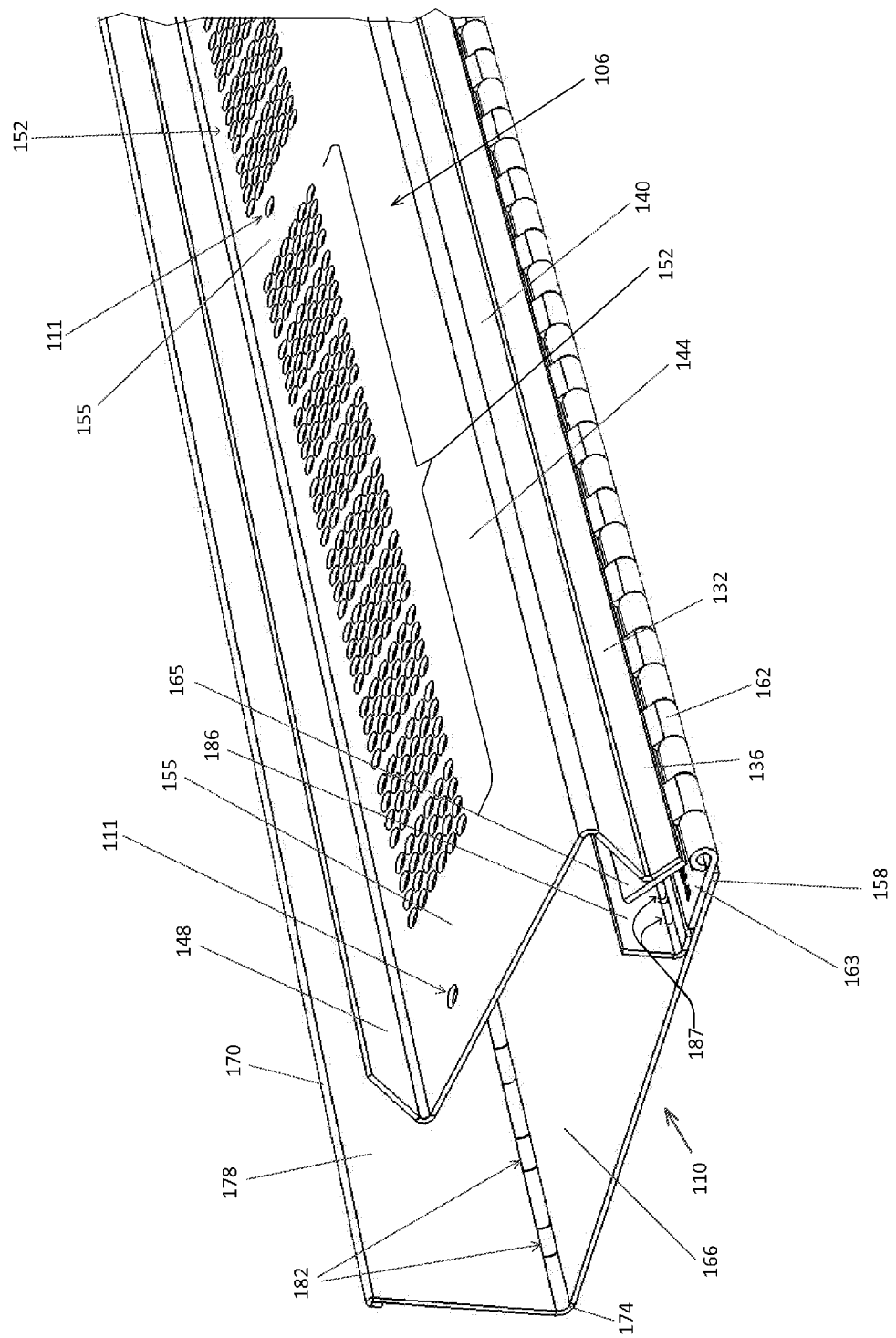
FIG. 4 is a perspective view of non-flanged ends of hinged base, gutter and vent portions of the partial roof ridge ventilation system of FIG. 1.
Figure 5:
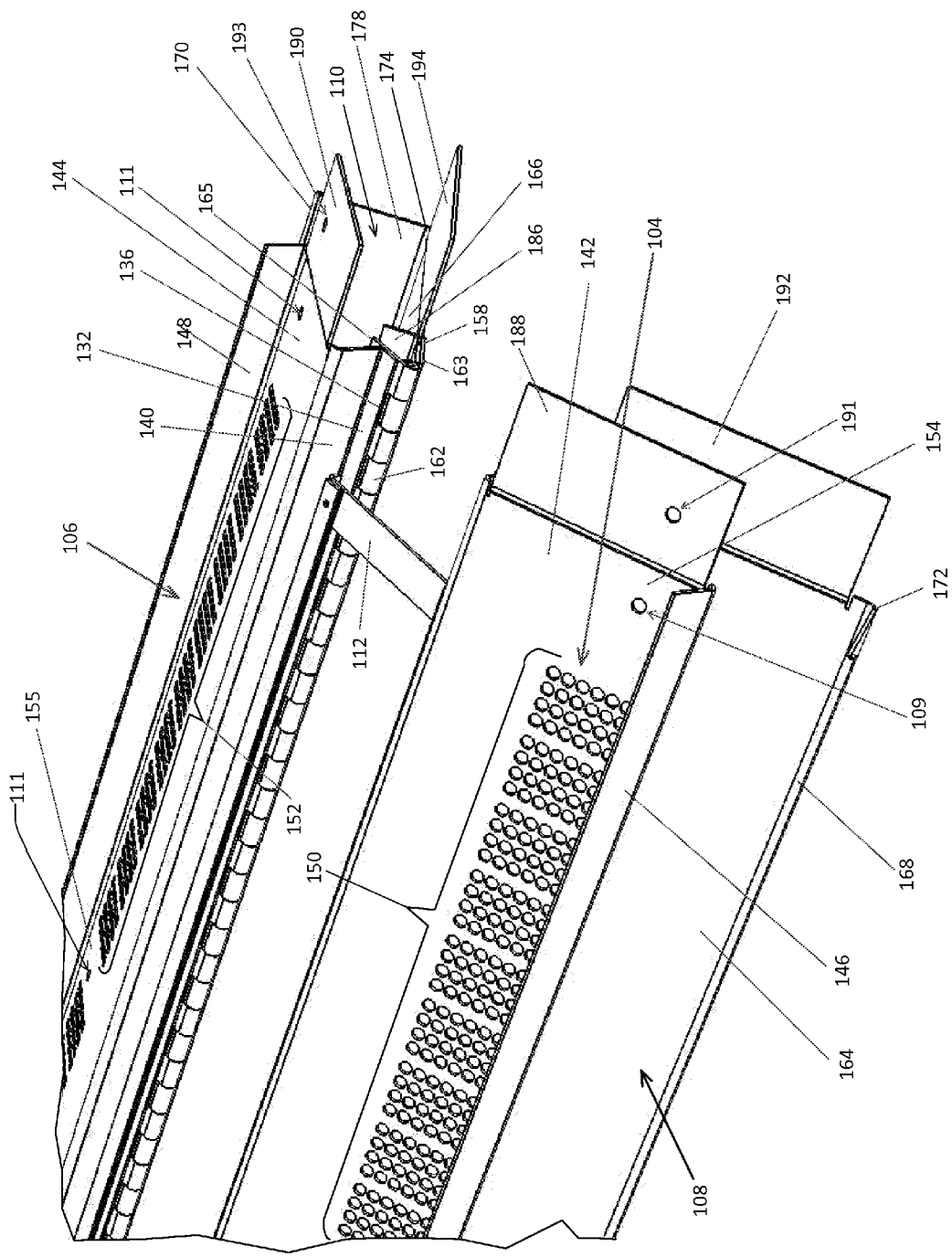
FIG. 5 is a perspective view of a mated pair of the ventilation system portions of FIG. 4 further comprising frame means and segment interconnection flanges.
Figure 15:
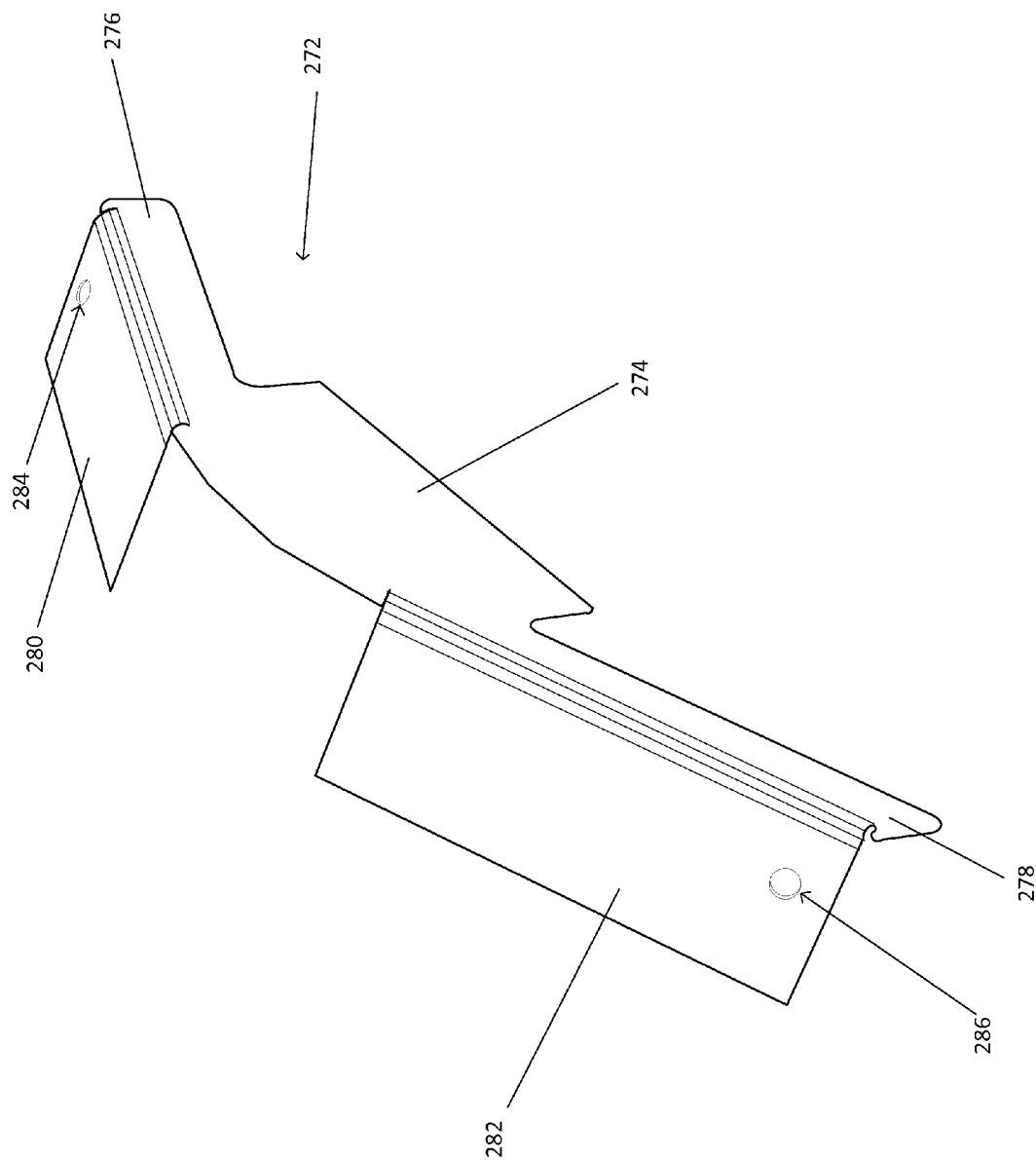
FIG. 15 is a perspective view of a removable end cover for closing the end of the air flow channel defined by the vent and hood portions of a roof ridge ventilation system in accordance with the invention.

In FIGS. 1 and 15 there is shown an end cover 272 (also referred to generically as an end member) for providing an enclosure at a non-flanged end of the vent members 104, 106. The same end cover 272 is also shown in FIG. 14 for use with the end cap 204. End cover 272 has a face plate 274 having extended channel enclosure portions 276, 278. Together, the face plate 274 and extended channel enclosure portions 276, 278 provide means for closing the end of the airflow channel defined by the hood member 102 and vent members 104, 106. The lower portion of the face plate 274 is coextensive with the ledge members 130, 132 to enclose the central channel defined by the vent members 104, 106 down to those ledge members and the opening in the roof.

The end cover 272 also comprises attachment flanges or tabs 280, 282, which, when installed, are overlapped by the panel members 116, 118, respectively, of hood member 102. Each attachment flange 280, 282 has a hole 284, 286, respectively, defined therein for alignment with holes 126, 128, respectively, to allow securing of the end cover 272 to the hood member 102 upon placing bolts through the hood member 102, the flanges 280, 282 and the vent members 104, 106. The bolts, not shown, are secured in place with nuts (not shown) placed thereon adjacent the underside of the vent at locations 154, 155 in vent floors 142, 144 to hold the bolts in place. It will be appreciated that the end cover 272 may be removed from the hood member 102 to allow installation of an additional segment of ridge vent 100, or the end cover may be left in place if, for example, an end cap 204 is to be installed. Such would have the salient effect of closing off the vent portion of the end cap 204 for more efficient operation of the ridge vent system 100. It will be appreciated that any means of covering the ends of a ridge vent segment, or abutted end-to-end segments, may be accomplished with either an end cover or an end cap, as defined herein, interchanging and appropriately matching interconnection flanges, or by using other appropriate means of interconnection between an end member and the ends of a ridge vent segment, or segments, and doing so would not depart from the scope and spirit of the invention as claimed.

Figure 9:
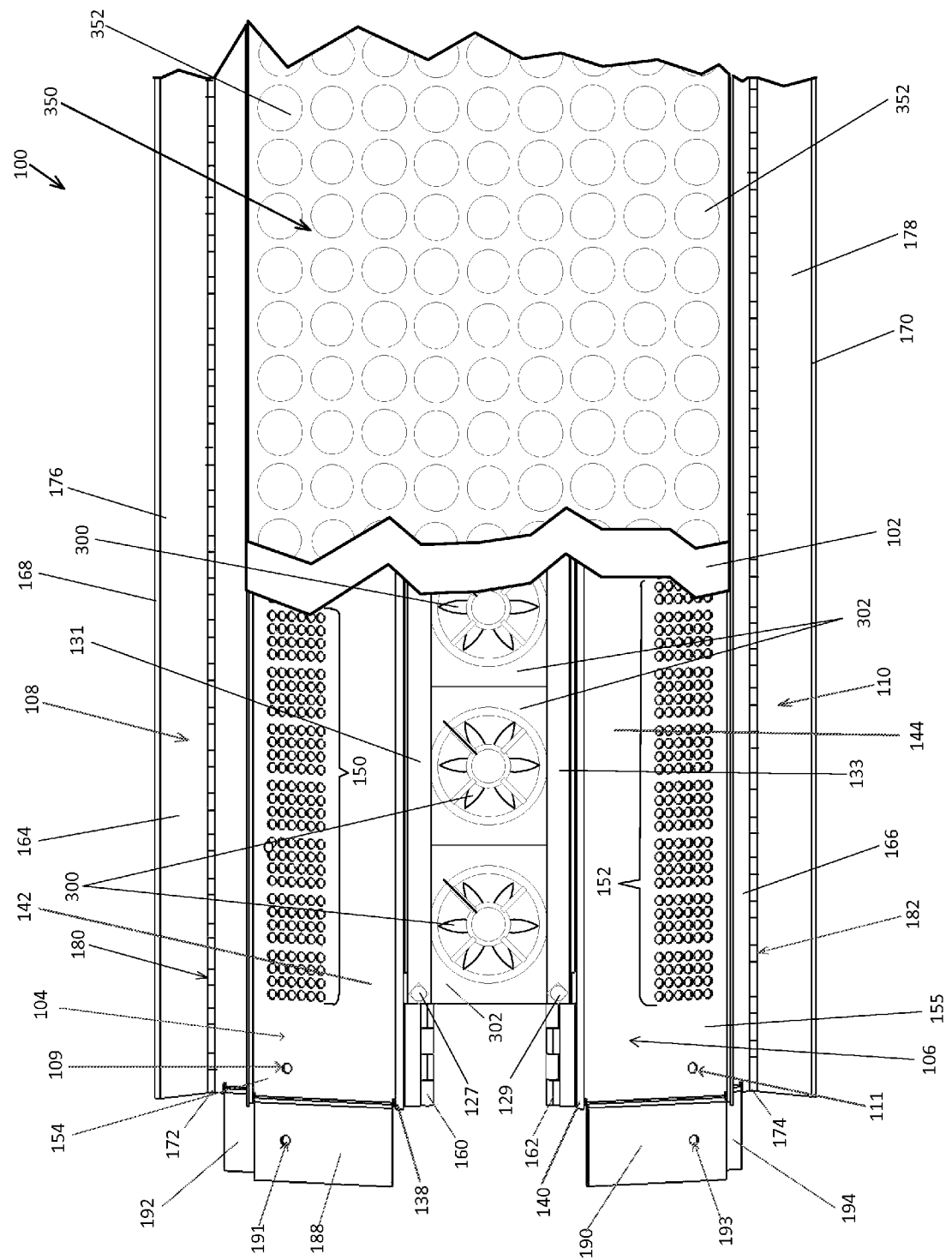
FIG. 9 is a top perspective view of part of a roof ridge ventilation system shown with part of the solar-to-electric conversion means and part of the hood member cut away to show a plurality of fan members in accordance with the invention.

Referring now specifically to FIGS. 8 and 9, there is shown in accordance with another aspect of the invention one, or preferably a plurality, of square frame, fans 300 installed in the ridge vent system 100. Fans 300 are preferably supported in place with the aid of frame means 112. Each spanning cross member of the frame 112 has a bent down tab 117, 119 at each end of the spanning cross member. Each tab 117, 119 is spot-welded to wall members 138, 140 of vent members 104, 106, to interconnect the vent members with the spanning cross members of the frame 112 and to provide a base for support of the fans 300. This support is accomplished in part because of the spot-weld, but also in part because the lower portion of each tab 117, 119 rests on ledges 130, 132 respectively.

Each of the spanning frame members 112 spans the opening at the ridge of the roof and serves to hold the fans directly above the opening at the most efficient location possible for ventilating the vent chutes 20 of the roof. Running longitudinally of the elongated vent members 104, 106, and perpendicular of the spanning frame members 112, are a pair of lower frame support members 113, 115, which are essentially strips of metal that serve as a lower support for the fans 300 in that the lower frame support members are interposed between a bottom edge of housing 302 for each fan and the spanning frame members 112.

There are also provided threaded studs 127, 129, or posts, that are screwed, secured or otherwise anchored, for example spot-welded, at their lower ends to spanning frame members 112 and lower frame support members 113, 115. The threaded studs 127, 129, the lower frame support members 113, 115 and the spanning frame members 112 may be welded together prior to installation of the product. Threaded studs 127, 129 pass through the lower frame support members 113, 115, as well as housings 302 of the fans 300 and extend upwardly to pass through a second, upper pair of frame support members 131, 133, which run parallel to lower frame support members 113, 115, and which engage the upper edge of the housings 302 of the fans 300 to hold them in place.

Upon installation of the fans 300, the upper frame support members 131, 133 are placed over the threaded studs 127, 129, and nuts are threaded onto the upper ends of the threaded studs 127, 129 adjacent the upper frame support members in order to secure the lower frame support members 113, 115, the fans 300 and the upper frame support members in sandwich construction fashion. Of course, it will be apparent to those of ordinary skill in the art that primarily the fans 300 are to be installed so as to convey the air upwardly away from the opening in the ridge portion of the roof during normal operation of the fans.

Solar means 350 for powering the fans 300 is provided comprising solar collection panel 352, solar frame 354 and wiring 356. The fans 300 suitable for use with the present invention comprise DC-powered, muffin-type fans, which are low-profile fans rated for 21 cubic feet per minute (CFM) of displacement. These relatively low-capacity fans are suitable for the purpose of adequately dissipating and ventilating the air at the ridge of the roof, since preferably there are a plurality of such fans to be employed. Thus, these smaller fans 300 are able to operate continuously as often required for such application, on the power able to be supplied by relatively small solar collection panels of size sufficient to be retained exclusively on the frame means 404 coextensive with the size of the hood member 102 of the ridge vent system 100 as shown in FIG. 9. Preferably, each fan has a solar collection panel to which it is directly wired right above the fan to minimize the amount of wiring needed. The wiring 356 from the solar panel 352 to the fan 300 passes through a rubber grommet 358 or other sealing mechanism.

Figure 10:
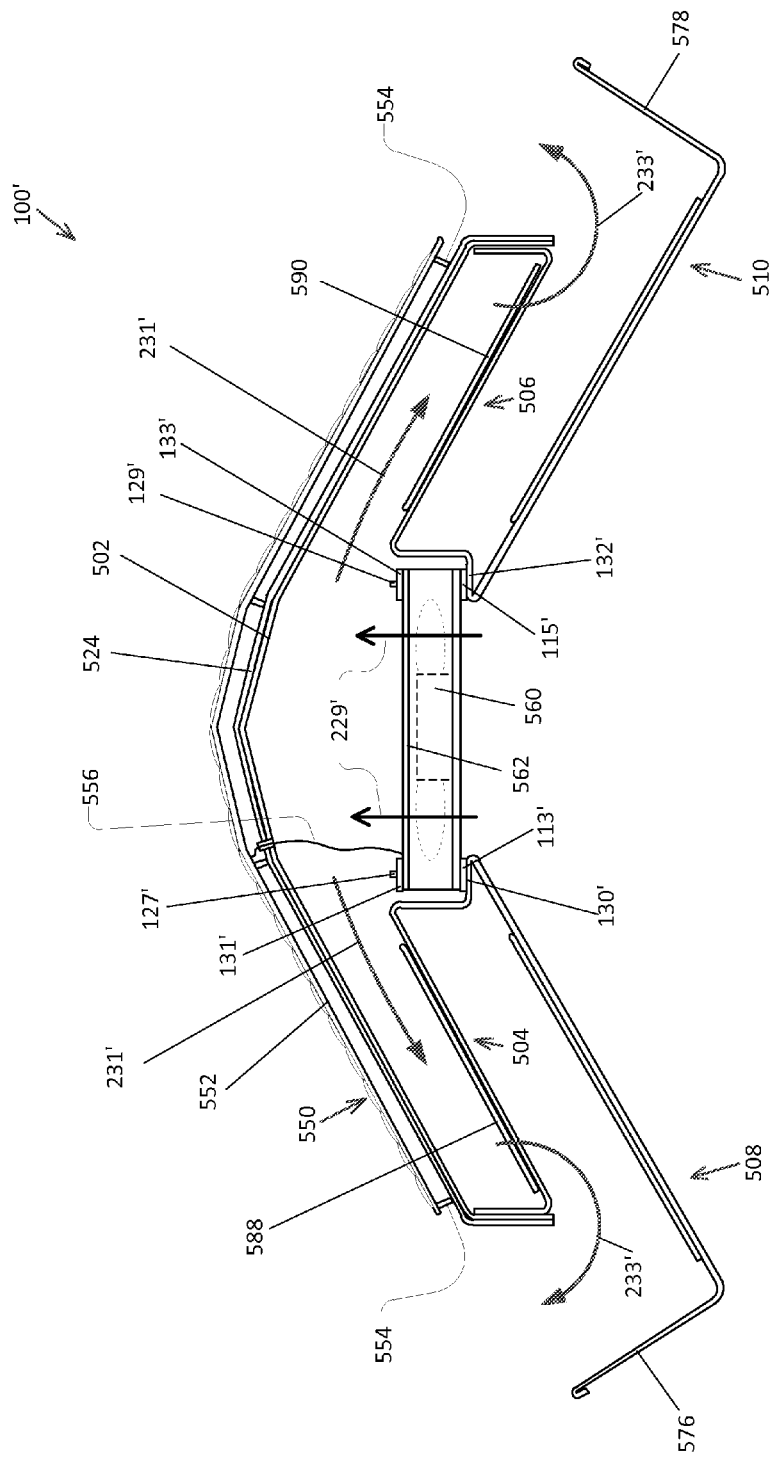
FIG. 10 is an end view of part of a roof ridge ventilation system not having an end member installed and in accordance with an alternate embodiment of the invention.

Referring to FIG. 10, there is provided an alternative embodiment of a ridge vent system 100'. The ridge vent system 100' is very similar to ridge vent system 100, in that it has an elongated hood member 502, elongated vent members 504, 506, solar power means 550 with solar collection panel 552, solar frame 554, and wiring 556. The ridge vent system 100' also comprises the same or similar fans 560 having housings 562. Further the ridge vent system 100' also comprises the same or similar elongated base members 508, 510 with outer wall/gutter members 576, 578. Also, the ridge vent system 100' comprises base flanges 592, 594, vent flanges 588, 590 and hood interconnection member 524, all which serve the same purpose as their counterpart members as described in connection with ridge vent system 100.

However, a first difference between ridge vent system 100' and ridge vent system 100 is that ridge vent system 100' does not employ spanning frame members 112. Rather, with ridge vent system 100', the longitudinally extending lower support frame members 113', 115' are either spot-welded directly to ledges 130', 132', or there are no lower support frame members 113, 115 at all, with the fan housing 562 simply resting on ledges 130', 132'. Thus, the threaded studs 127', 129', in this alternative embodiment, are welded, threaded or otherwise attached to lower frame members 113', 115', or directly to ledges 130', 132', and the threaded studs extend upwardly from their attachment points, through the housings 562 of the fans 560, and through upper frame members 131', 133'. The upper frame members 131', 133' and the fans 560 are preferably held in place on the lower frame members 113', 115', or directly on the ledges 130', 132' with nuts (not shown) screwed onto the upper threads of the threaded studs adjacent the upper frame members.

Another difference between ridge vent system 100' and ridge vent system 100 is that ridge vent system 100' does not have hinges interconnecting vent members 504, 506 and base members 508, 510, respectively, but rather this embodiment simply employs a sheet metal bend, or a preset angle if made of plastic, between the vent members and base members. Thus, embodiment 100' could be utilized for standard pitch roof systems, or alternatively, they could be custom made or an installer could bend the base portions 508, 510 to match the pitch of the roof on which the system is installed. Since there are no hinge members with alternative embodiment 100', there is no need for inner walls 184, 186 to prevent water from being blown into the opening at the ridge of the roof.

Figure 11:
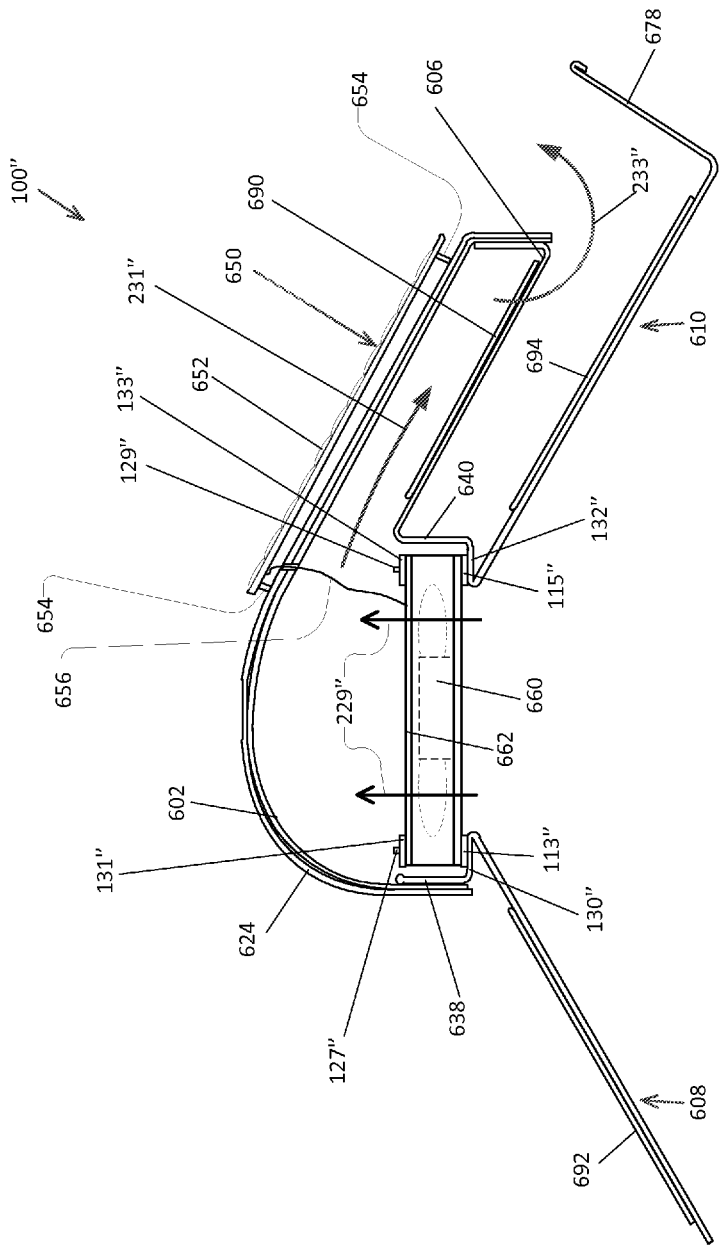
FIG. 11 is an end view of part of a roof ridge ventilation system not having an end member installed in accordance with yet another alternative embodiment of the invention.

Referring to FIG. 11, there is provided another alternative embodiment of a ridge vent system 100". The ridge vent system 100" is similar to ridge vent system 100 and 100', in that it has an elongated hood member 602, an elongated vent member 604, solar power means 650 with solar collection panel 652, solar frame 654, and wiring 656. The ridge vent system 100" also comprises the same or similar fans 660 having housings 662. Further the ridge vent system 100" comprises the same or similar elongated base members 608, 610 with a single outer wall/gutter member 678. Also, the ridge vent system 100" comprises base flanges 692, 694 a vent flange 690 and hood interconnection member 624, all which serve the same or similar purpose as their counterpart members as described in connection with ridge vent systems 100 and 100'.

However, like ridge vent system 100' ridge vent system 100" does not employ spanning frame members 112. Rather, with ridge vent system 100", the longitudinally extending lower support frame members 113", 115" are either spot-welded directly to ledges 130", 132", or there are no lower support frame members 113", 115" at all, with the fan housing 662 simply resting on ledges 130", 132". Thus, the threaded studs 127", 129", in this alternative embodiment, are welded, threaded or otherwise attached to lower frame members 113", 115", or directly to ledges 130", 132", and the threaded studs extend upwardly from their attachment points, through the housings 662 of the fans 660, and through upper frame members 131", 133". The upper frame members 131", 133" and the fans 660 are preferably held in place on the lower frame members 113", 115", or directly on the ledges 130", 132" with nuts (not shown) screwed onto the upper threads of the threaded studs 127", 129" adjacent the upper frame members.

A primary difference between the alternate embodiment ridge vent system 100" and ridge vent systems 100, 100', is that ridge vent system 100" employs a unidirectional hood 602, so that ventilated air is routed through a single air flow channel designated by arrows 226" instead of bi-directionally as shown in FIG. 10 in connection with ridge vent system 100' and as shown bi-directionally in FIGS. 7 and 8 in connection with ridge vent system 100. Thus, with embodiment 100", there is not an entire vent member 104, but rather only a ledge 130" and vent inner walls 638, 640 for defining a central channel for air flow and in which fans 660 are retained.

Also, similar to the embodiment 100' shown in FIG. 10, ridge vent system 100" may comprise a sheet metal bend connecting vent member 606 and base member 610, or a preset angle if made of plastic, between the ledge 132" of the vent member 606 and the base member 610, as well as between the base member 608 and the ledge 130". As such, embodiment 100" could be utilized for standard pitch roof systems, or alternatively, could be custom made or an installer could bend the base portions 608, 510 to match the pitch of the roof on which the system is installed. If no hinge members are employed with alternative embodiment 100", there is no need for inner walls 184, 186 to prevent water from being blown into the opening at the ridge of the roof.

Of course, it will be appreciated by those of ordinary skill in the art that combinations of the elements and features of the aforementioned embodiments may be mixed and matched without departing from the true scope and spirit of the invention. For example, embodiments 100' and 100" could easily employ hinges and inner walls 184, 186 (not shown), or embodiment 100 could easily employ frame means like that of embodiments 100', 100", without departing from the true scope and spirit of the invention. A primary objective of the invention, thus, is to provide for air flow through soffits 30 as shown by arrow 235, through the vent chutes as shown by arrows 226, or alternatively the attic as shown by arrows 228, through the central housing of the ridge vent system as shown by arrows 229, 229', 229", through the vent as shown by arrows 231, 231', 231" and out of the vent as shown by arrows 233, 233', 233" as defined by vent members and a hood, whether with a fan or without. When a fan is employed, however, it is an objective of the invention to provide for housing of the fan immediately above the opening in a ridge portion of a roof, directly in the air flow path shown by arrows 229, 229', 229". Thus, any embodiment of the invention that places a fan or fans directly in such a channel defined by an elongated vent housing installed along the ridge of a roof would not depart from the true spirit and scope of the invention.

Preferably, the roof ridge ventilation system 100, 100', 100" comes from the manufacturer with the base members 108, 110 and hinged vent members 104, 106 being already interconnected by the frame 112, 113, 115, 131, 133 being spot-welded to the vent members. In this case, the roof ridge ventilation system 100, 100', 100" may be easily installed as an interconnected mated pair of longitudinally extending and parallel-oriented components as received from the manufacturer.

Alternatively, the system 100, 100', 100" may be installed in stages from component parts using screws and bolts to interconnect the frame members 112, 113, 115 to the vent members 104, 106. Either way, the various elongated components may be more easily manufactured in longer lengths, allowing for cutting of lengths on the job for customizing the system to shorter ridge lines.

The preferred method of installation of the roof ridge ventilation system 100, 100', 100" comprises nailing, screwing or otherwise attaching adjacent an opening at the ridge of a roof a pair of elongated base members 108, 110, each base member of the pair being installed on one side of the opening, each base member having hinged thereto an elongated vent member 104, 106, respectively, the vent members being already interconnected by frame means 112, 113, 115, and hinges 160, 162 installed, as received from the manufacturer. The base members 108, 110 are evenly spaced from and along the opening, with the opening positioned along a longitudinally extending centerline of the elongated pair of interconnected base members.

Alternatively, where the system comes from the manufacturer in component parts, the method of installation of the component parts is as follows: an installer first lays down the base 108 and hinged vent member 104 of the system. This may be accomplished by nailing, screwing or otherwise fastening the base at a pre-determined distance from the opening at the ridge of the roof. The pre-determined distance from the centerline of the roof ridge, for fastening the base members 108, 110, is one half of the width of the hood member outer edges. After the first base 108 is installed in this way, the second base 110 is likewise installed on the opposite side of the ridge line opening in the roof, each of the base 108, 110 and vent member 104, 106 combinations being installed with the hinged portion interconnecting the inner edges of the base and vent members being installed along and adjacent the opening in the ridge of the roof at the predetermined distance from the opening in the roof.

Continuing with the alternate method of installation, once the base 108, 110 and vent members 104, 106 are installed, a first part of the frame member 112 is then installed so as to interconnect the vent members, with the frame member spanning the opening at the roof's ridge, to provide a frame or base for one or more fans to be optionally installed before installation of the hood 102 and end cap 204 members. The frame member 112 is screwed or bolted to a ledge 130, 132 formed in either the base members, or to the central channel wall 138, 140 of each of the vent members 104, 106 to form a base on which frame members 113, 115 and fans 300 or a fan tray may rest.

With either means of installation, if one or more fan members 300 are to be installed on the frame 113, 115, a second part of the frame member 131, 133 is installed with screws so as to fix the fan member or members to the first part of the frame member and between the two previously installed vent members 104, 106. Installation of the first and second frame members 113, 115, 131, 133 may be suitably accomplished with nut and bolt combinations or a metal screw. Alternatively, the first part of the frame member 113, 115 may comprise a fan tray that rests on or is comprised of the ledge 130, 132 formed into the base members or the vent members, with the second part of the frame member 131, 133 being a strip of metal that is placed along the top of the fan housings 302 with screw holes therein for screwing down the strip of metal so as to engage the top of the fan housings with the screw passing into the tray and ledge to secure the fans into place. As another alternative, a housing for retaining fan members 300 may be formed into a central air flow channel of the vent members themselves. Still further, preferably, there are provided threaded studs 127, 129 welded or otherwise attached to the frame means and extending upwardly at various intervals for mounting fan housings 302 on the threaded studs, the fan housings being secured on the threaded studs and the first frame means with the second frame means strip of metal 131, 133 being bolted into place on top of the fan housings in order to clamp the fans into place.

After the frame members 112, 113, 115, 131, 133 and any fans 300 are installed, the elongated hood member 102 is then placed with the outer edges 120, 122 of the hood member being placed over the outer edges 146, 148 of the vent members 104, 106. Preferably, the hood member 102 has thereon an overhanging outer wall portion 120, 122 along the outer edge that engages outer edge walls 146, 148 of the vent members 104, 106, the hood member resting on the outer edge walls of the vent members after installation. Screw holes 126, 128 are provided in the hood member 102 and the vent members 104, 106 to allow installation of screws through the top of the hood member and through the vent member allowing for placement of a nut on the underside of the vent member to hold the hood in place on top of the vent member with sufficient force to withstand winds at the top of the roof ridge. Conventional means for sealing the screw holes, such as a rubber gasket in the hood member, may be employed as necessary. In this way the hood member 102 is also readily removable to replace fans 300 as would become necessary from time to time when fans are installed in the ridge vent system 100, 100', 100".

While a preferred embodiment of the present invention has been shown and described, it will be apparent to those skilled in the art that many changes and modifications may be made without departing from the invention in its broader aspects. The appended claims are therefore intended to cover all such changes and modifications as fall within the true spirit and scope of the invention.

What is claimed is:

1. A roof ridge ventilation system comprising:
    a hood member comprising first and second ends and first and second outer wall portions;
    first and second vent members comprising first and second ends and inner edge portions and outer edge wall portions, the outer edge wall portions of said vent members adapted for engagement with the outer wall portions of said hood member for defining outer vent walls, said vent members comprising central wall means defining a central air flow channel, the vent members also comprising ledges along the inner edge portions of the vent members, and said vent members having defined therein air holes adapted to allow passage of air through said vent members;
    first and second base members corresponding to said first and second vent members and comprising inner and outer edge portions, the inner edge portion of each said base member being hinged respectively to the corresponding inner edge portion of each said vent member so as make each hinged first base member and corresponding first vent member adapted for installation on the ridge area of differently-pitched roofs without requiring bending of the base member or corresponding vent member, each of the outer edge portions defining a wall adapted for blocking wind from entering the air holes of said vent members;
    a plurality of spanning frame members supported by the ledges of the vent members, said spanning frame members adapted for spanning an opening in the ridge portion of the roof, and for interconnecting said first vent member and said first base member with said second vent member and said second base member, said vent and base members being adapted for being installed one of each on each side of the opening in the ridge portion of the roof, said spanning frame members and said ledges being adapted for retaining a plurality of fan members directly above the opening in the ridge portion of the roof between said first and second vent members; and
    first and second end members adapted for attachment to each of the first and second ends of said vent members and the first and second ends of said hood member to further define the airflow channel adapted for passage of air from the opening in the ridge portion of the roof through the vent air holes.

2. The roof ridge ventilation system of claim 1, wherein the ledges and spanning frame members are adapted for retaining the fan members in the central airflow channel of said vent members and directly in the airflow path from under the roof through the vent air holes to ventilate from under the roof.

3. The roof ridge ventilation system of claim 1, wherein at least one of said vent members, said base members and said frame members is made of aluminum.

4. The roof ridge ventilation system of claim 1, wherein said hood member is made of plastic.

5. The roof ridge ventilation system of claim 1, further comprising a fan member retained within said frame means, said system further comprising solar-to-electric conversion means operatively connected to said fan member for powering the fan member.

6. The roof ridge ventilation system of claim 1, further comprising drainage means incorporated into each said base member wall for blocking wind.

7. The roof ridge ventilation system of claim 6, wherein each said base member wall for blocking wind further comprises a base portion and wherein the base portion of each said base member wall for blocking wind has defined a plurality of holes therein for drainage of water.

8. A roof ridge ventilation system comprising:
    a hood member comprising first and second ends and first and second outer wall portions;
    first and second vent members comprising first and second ends and inner edge portions and outer edge wall portions, the outer edge wall portions of said vent members adapted for engagement with the outer wall portions of said hood member for defining outer vent walls, each vent member comprising central wall means defining a central air flow channel and each said vent member having defined therein air holes adapted to allow passage of air through each said vent member;
    first and second base members corresponding to said first and second vent members and comprising inner and outer edge portions, the inner edge portion of each said base member being hinged respectively to the corresponding inner edge portion of each said vent member so as make each hinged first base member and corresponding first vent member adapted for installation on the ridge area of differently-pitched roofs without requiring bending of the base member or corresponding vent member, each of the outer edge portions defining a wall adapted for blocking wind from entering the air holes of said vent members;

frame means adapted for spanning an opening in the ridge portion of the roof, for interconnecting said first vent member and said first base member with said second vent member and said second base member, said vent and base members being adapted for being installed one of each on each side of the opening in the ridge portion of the roof, said frame means being adapted for retaining a plurality of fan members directly above the opening in the ridge portion of the roof between said first and second vent members; and first and second end members adapted for attachment to each of the first and second ends of said vent members and the first and second ends of said hood member to further define the airflow channel adapted for passage of air from the opening in the ridge portion of the roof through the vent air holes; and an inner wall attached to each said base member adapted for preventing water from being blown into the hinge between each said vent member and each said base member and hence adapted for preventing water from being blown into the opening at the ridge of the roof.

9. The roof ridge ventilation system of claim 8, wherein each said inner wall for preventing water further comprises an attachment portion for attachment of each said inner wall to each said base member, each said inner wall for preventing water further comprising drainage means at the attachment portion of each said wall for preventing water.

10. A roof ridge ventilation system comprising:

a first base member having inner and outer edges, the inner edge being adapted for pivotable interconnection along at least a portion of the length of the inner edge, said first base member having a wall for blocking wind formed therein along the length thereof adjacent the outer edge;

a first vent member having first and second ends and inner and outer edges, the inner edge adapted for pivotable interconnection and having a pivotably connected portion along the at least a portion of the length of the inner edge of said first base member, the outer edge defining an airflow channel outer wall portion, said vent member defining a plurality of vent holes to allow for airflow through said vent member, said first vent member comprising wall means for defining a housing and a central air flow channel along the length thereof adapted for allowing airflow to pass through the vent holes;

a second base member having inner and outer edges, the inner edge being adapted for pivotable interconnection along at least a portion of the length of the inner edge, said second base member having a wall for blocking wind formed therein along the length thereof adjacent the outer edge;

a second vent member having first and second ends and inner and outer edges, the inner edge adapted for pivotable interconnection and comprising a pivotably connected portion along the at least a portion of the length of the inner edge of said second base member, the outer edge defining an airflow channel outer wall portion, said second vent member defining a plurality of vent holes to allow for airflow through said second vent member, said second vent member comprising wall means for defining a housing and a central air flow channel along the length thereof adapted for allowing airflow to pass through the vent holes;

frame means retained in the central air flow channel housing and adapted for spanning the opening in the ridge portion of the roof;

at least one fan retained by said frame means in the central air flow channel housing and adapted for being retained directly above an opening in the ridge of the roof;

a hood member having first and second ends, said hood member adapted for covering said first and second vent members and adapted for further defining an upper wall for the airflow channel which, together with said first and second vent members and their respective airflow channel outer wall portions and vent holes and the wall means for spacing said vent members from said base members together define an airflow channel adapted for the passage of air from an opening in the ridge portion of the roof through the vent holes; and first and second end members adapted for attachment to the first and second ends of said vent members respectively and the first and second ends of said hood member respectively to further define the airflow channel adapted for passage of air from the opening in the ridge portion of the roof through the vent holes.

11. The roof ridge ventilation system of claim 10, wherein said frame means retains a plurality of fan members above the ridge portion of the roof between said first and second vent members.

12. The roof ridge ventilation system of claim 10, wherein each of said first and second vent members further comprise a ledge member along the inner edges of the vent members adapted for providing a shelf for said frame means aiding in the retention of said at least one fan member above the ridge portion of the roof between said first and second vent members.

13. The roof ridge ventilation system of claim 10, where at least one of said vent members, said base members and said frame means is made of aluminum.

14. The roof ridge ventilation system of claim 10, where said hood member is made of plastic.

15. The roof ridge ventilation system of claim 10, further comprising solar-to-electric conversion means operatively connected to said at least one fan member for powering said at least one fan member.

16. The roof ridge ventilation system of claim 10, further comprising drainage means incorporated into the wall for blocking wind.

17. The roof ridge ventilation system of claim 16, wherein said drainage means comprises the wall for blocking wind having an attachment portion for attachment to said base means, the wall having defined holes therein at the attachment portion thereof for drainage of water.

18. The roof ridge ventilation system of claim 10, further comprising a wall adapted for preventing water from being blown into the pivotably connected portion between said vent member and said base member and hence adapted for preventing water from being blown into the opening at the ridge of the roof.

19. The roof ridge ventilation system of claim 18, wherein said wall adapted for preventing water further comprises an attachment portion for attachment to said base member, said wall for preventing water further comprising drainage means at the attachment portion of said wall for preventing water.

20. A method of installing a roof ridge ventilation system comprising the steps of:

attaching adjacent an elongated opening at the ridge of a roof a pair of elongated base members, each base member of the pair being installed on one side of the opening with the opening positioned along a longitudinally extending centerline between the frame means, each base member having hinged thereto a corresponding elongated vent member comprising first and second ends, inner edge portions and outer edge wall portions, the vent members comprising central wall means defining a central air flow channel, the vent members also comprising ledges along the inner edge portions of the vent members, the vent members having defined therein holes adapted to allow passage of air through the vent members, the base members and vent members adapted for installation adjacent the ridge area of differently-pitched roofs without requiring bending of the base members or corresponding vent members, each base member comprising inner edge portions and outer edge portions, each of the outer portions defining a wall adapted for blocking wind from entering the holes of said vent members, the vent members being interconnected by a plurality of spanning frame members supported by the ledges of the vent members, the spanning frame members adapted for spanning the opening in the ridge portion of the roof;

placing a plurality of fan members on the spanning frame members for retention of the fan members directly above the opening in the ridge of the roof;

fastening the fan members to the spanning frame members;

attaching a hood member over the top of the vent members and the plurality of fan members contained therein with outer edges of the hood member engaging outer edges of the vent members; and attaching end members engaging end portions of each of the hood member and the vent members.

21. The method of claim 20, wherein said step of attaching adjacent an elongated opening further comprises the steps of:

attaching a base portion of an elongated first base and hinged vent member combination a predetermined distance from a centerline of an opening in the ridge of a roof with the hinged portion of the base and vent member combination being installed the predetermined distance from and adjacent the opening;

attaching a base portion of an elongated second base and hinged vent member combination a predetermined distance from the centerline of the opening in the ridge of the roof with the hinged portion of the base and vent member combination being installed the predetermined distance from and adjacent the opening; and interconnecting the base and vent member combinations with the spanning frame members spanning the opening at the roof's ridge.

22. A roof ridge ventilation system housing a plurality of fans for ventilating a plurality of vent chutes comprising:

an elongated hood member comprising first and second ends and at least one edge wall portion;

an elongated vent member comprising first and second ends, a central air flow channel portion adapted for communicating with a plurality of vent chutes and an outer air flow channel portion adapted for engagement with the at least one edge wall portion of said hood member, said vent member having defined therein air holes adapted to allow passage of air through the air flow channels of said vent member, said vent member defining a housing portion within an air flow channel of said vent member and adapted for retaining a plurality of fans;

first and second elongated base members, each said base member comprising first and second ends, an inner edge portion and an outer edge portion, the inner edge portion of each said base member being connected to the channel portion of said vent member, the outer edge portion of at least one said base member defining a wall adapted for blocking wind from entering the air holes of said vent member;

first and second end members adapted for attachment to each of the first and second ends of said vent member and the first and second ends of said hood member to further define the airflow channel adapted for passage of air from the opening in the ridge portion of the roof through the vent member air holes; and a plurality of fans, each fan retained within an airflow channel of the housing of said vent member directly above an opening in the ridge of the roof.

23. The roof ridge ventilation system of claim 9, wherein said drainage means comprises a plurality of holes defined at the attachment portion of each said wall for preventing water.

24. A roof ridge ventilation system adapted for retaining a plurality of smaller fans directly above an opening in the ridge of a roof comprising:

a hood member comprising first and second ends and first and second outer wall portions;

first and second vent members comprising first and second ends and inner edge portions and outer edge wall portions, the outer edge wall portions of said vent members adapted for engagement with the outer wall portions of said hood member for defining outer vent walls, said vent members comprising central wall means defining a central air flow channel, the vent members comprising ledges along the inner edge portions of the vent members, and said vent members having defined therein air holes adapted to allow passage of air through said vent members;

first and second base members corresponding to said first and second vent members and comprising inner and outer edge portions, the inner edge portion of each said base member being interconnected with a bend to each corresponding inner edge portion of each said vent member so as to make each connected first base member and corresponding first vent member adapted for installation on the ridge area of differently-pitched roofs by bending of the base member or corresponding vent member, each of the outer edge portions defining a wall adapted for blocking wind from entering the air holes of said vent members;

a plurality of spanning frame members each adapted for spanning an opening in the ridge portion of the roof, for interconnecting said first vent member and said first base member with said second vent member and said second base member, said vent and base members being adapted for being installed one of each on each side of the opening in the ridge portion of the roof, said spanning frame members and the ledges being adapted for retaining a plurality of fan members directly above the opening in the ridge portion of the roof between said first and second vent members and directly in an airflow path from under the roof through the vent air holes; and first and second end members adapted for attachment to each of the first and second ends of said vent members and the first and second ends of said hood member to further define the airflow channel adapted for passage of air from the opening in the ridge portion of the roof through the vent air holes.

* * * * *